US012643811B2

(12) United States Patent　　　　　(10) Patent No.:　US 12,643,811 B2
Winstanley et al.　　　　　　　　　　(45) Date of Patent:　　Jun. 2, 2026

(54) METHOD FOR SHAPING COATED GLASS SHEETS

(71) Applicant: Pilkington Group Limited, Nr. Ormskirk (GB)

(72) Inventors: Neil Winstanley, St Helens (GB); Andrew Thomas Stanley, Ormskirk (GB); Josef Banas, Sandomeirz (PL)

(73) Assignee: Pilkington Group Limited, Nr. Ormskirk (GB)

( * ) Notice: Subject to any disclaimer, the term of this patent is extended or adjusted under 35 U.S.C. 154(b) by 536 days.

(21) Appl. No.: 17/633,262

(22) PCT Filed: Aug. 7, 2020

(86) PCT No.: PCT/GB2020/051894
　　§ 371 (c)(1),
　　(2) Date: Feb. 7, 2022

(87) PCT Pub. No.: WO2021/023999
　　PCT Pub. Date: Feb. 11, 2021

(65) Prior Publication Data
　　US 2022/0340471 A1　　Oct. 27, 2022

(30) Foreign Application Priority Data
　　Aug. 8, 2019　(GB) ..................................... 1911334

(51) Int. Cl.
　　*C03B 23/03*　　　(2006.01)
　　*C03B 23/025*　　(2006.01)
　　(Continued)

(52) U.S. Cl.
　　CPC ...... *C03B 23/0302* (2013.01); *C03B 23/0252* (2013.01); *C03B 23/0256* (2013.01);
　　(Continued)

(58) Field of Classification Search
　　None
　　See application file for complete search history.

(56) References Cited

U.S. PATENT DOCUMENTS

| 4,666,492 A | 5/1987 | Thimons et al. |
| 4,838,920 A | 6/1989 | Blasquez-Gonzales et al. |
| | (Continued) | |

FOREIGN PATENT DOCUMENTS

| EP | 0301755 A2 | 2/1989 |
| GB | 2186001 A | 8/1987 |
| | (Continued) | |

OTHER PUBLICATIONS

GB Search Report issued in corresponding Application No. GB1911334.9 dated Nov. 20, 2019.
(Continued)

*Primary Examiner* — Lisa L Herring
(74) *Attorney, Agent, or Firm* — BUCHANAN INGERSOLL & ROONEY PC

(57) ABSTRACT

A method for shaping a coated glass sheet involves conveying the coated glass sheet through a furnace to heat the coated glass sheet to a temperature suitable for shaping. The coated glass sheet is then deposited on a first bending tool for supporting the coated glass sheet and is at a first position relative to the first bending tool. A first portion of the coated glass sheet is contacted to move the coated glass sheet to a second position relative to the first bending tool. The coated glass sheet is then shaped on the first bending tool. Other aspects include a method for adjusting the position of a hot coated glass sheet on a bending tool and a shaping line for shaping a coated glass sheet comprising a positioning device for contacting a first portion of a coated glass sheet on a bending tool to adjust the position thereof.

17 Claims, 11 Drawing Sheets

(51) Int. Cl.
*C03B 23/035* (2006.01)
*C03C 17/36* (2006.01)
(52) U.S. Cl.
CPC ........ *C03B 23/0307* (2013.01); *C03C 17/366*
(2013.01); *C03B 23/0357* (2013.01); *C03B*
*2225/02* (2013.01)

(56) References Cited

U.S. PATENT DOCUMENTS

| | | | |
|---|---|---|---|
| 5,017,210 A | 5/1991 | Petitcollin et al. | |
| 5,122,177 A | 6/1992 | Yoshizawa et al. | |
| 5,279,635 A | 1/1994 | Flaugher et al. | |
| 5,660,609 A | 8/1997 | Muller et al. | |
| 5,735,922 A | 4/1998 | Woodward et al. | |
| 5,743,931 A | 4/1998 | Flaugher et al. | |
| 5,755,845 A | 5/1998 | Woodward et al. | |
| 6,495,261 B1 * | 12/2002 | Gagliardi | B32B 17/10036 |
| | | | 296/84.1 |
| 7,866,187 B2 | 1/2011 | Boisselle et al. | |
| 2009/0046355 A1 * | 2/2009 | Derda | B32B 17/10541 |
| | | | 359/359 |
| 2010/0190001 A1 * | 7/2010 | Barton | B32B 17/10174 |
| | | | 65/60.2 |
| 2015/0007612 A1 | 1/2015 | King et al. | |
| 2017/0267567 A1 * | 9/2017 | Harjunen | C03B 27/0442 |
| 2018/0186681 A1 * | 7/2018 | Dechirot | C03B 23/03 |
| 2021/0317029 A1 * | 10/2021 | Myl | C03B 29/00 |

FOREIGN PATENT DOCUMENTS

| | | | | |
|---|---|---|---|---|
| GB | 2403731 A * | 1/2005 | ....... | B32B 17/10036 |
| WO | 03004424 A2 | 1/2003 | | |
| WO | 2010134957 A2 | 11/2010 | | |
| WO | 2016189319 A1 | 12/2016 | | |
| WO | 2018087572 A1 | 5/2018 | | |
| WO | 2018096339 A1 | 5/2018 | | |

OTHER PUBLICATIONS

International Search Report (PCT/ISA/210) and Written Opinion (PCT/ISA/237) mailed on Oct. 29, 2020, by the European Patent Office as the International Searching Authority for International Application No. PCT/GB2020/051894.
"Glass in building—Determination of the emissivity," BSI Standards Publication, The British Standards Limited, Mar. 2019. (24 pages).

* cited by examiner

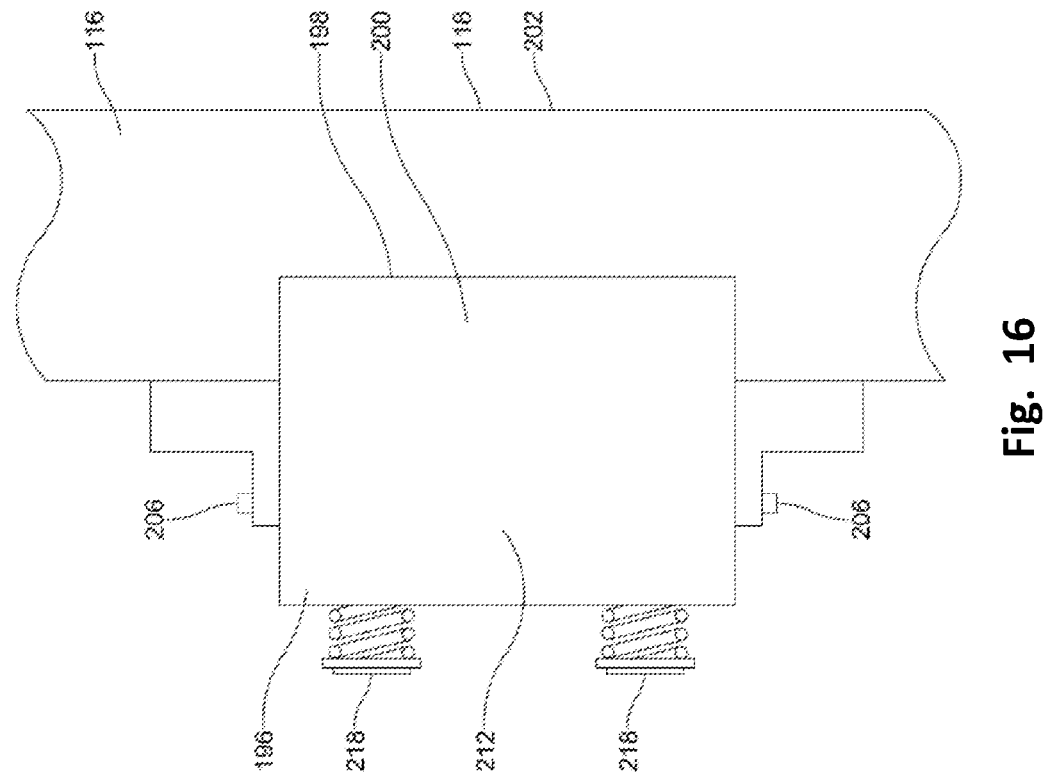
Fig. 16
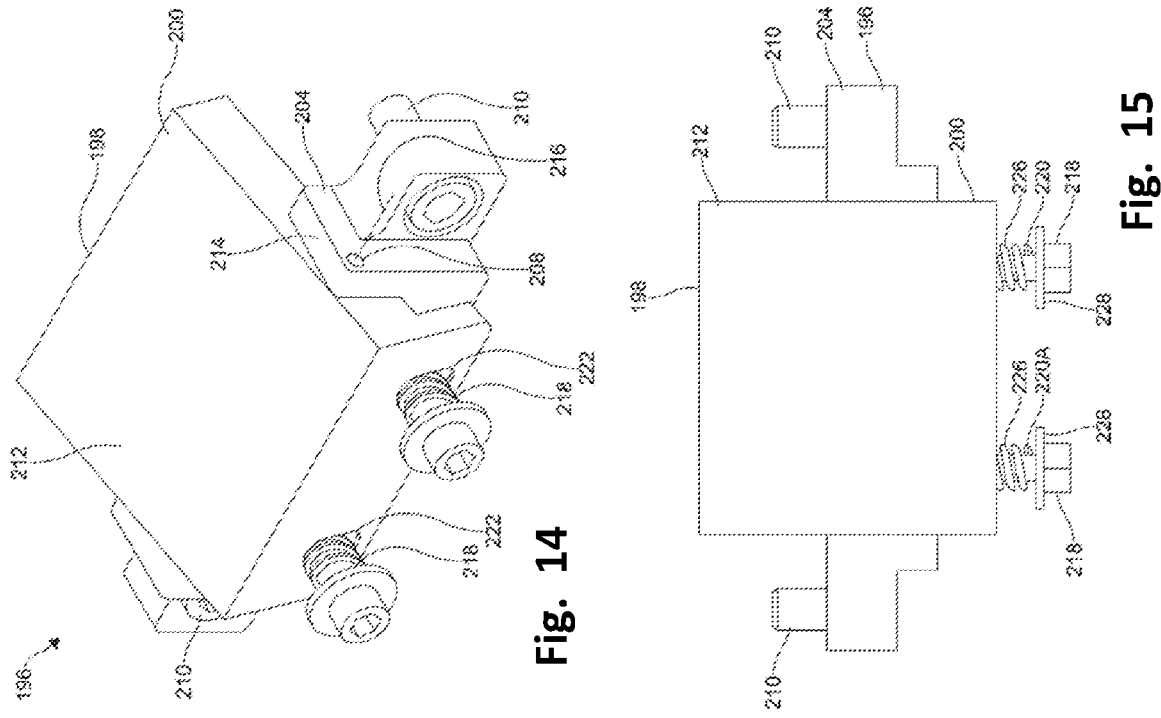
Fig. 14
Fig. 15

METHOD FOR SHAPING COATED GLASS SHEETS

The present invention relates to a method for shaping a coated glass sheet, to a method for aligning a hot coated glass sheet and to a shaping line for shaping a coated glass sheet.

Various processes are known for shaping or bending a sheet of glass. Typically, a glass sheet is heated to a temperature where the glass sheet is deformable and the bending process carried out. In certain bending processes, the heated glass sheet is supported on a ring and allowed to sag under the influence of gravity, with or without the assistance of an additional pressing force. The ring may comprise two rings configured to bend the glass sheet in two bending phases, for example as described U.S. Pat. No. 5,660,609.

Another known glass sheet bending process is a press bending process whereby a glass sheet (or a nested pair) is bent between a pair of complementary shaping members, usually in a spaced vertical relationship. Various configuration of shaping members are known for the pair of complementary shaping members, for example it is known to have a lower annular ring and an upper solid male, with examples provided in U.S. Pat. Nos. 5,279,635 and 5,755,845. U.S. Pat. No. 5,735,922 also describes a method and apparatus for press bending a glass sheet. In other versions of a press bending process, a split upper mould may be used with a lower annular ring, for example as described in U.S. Pat. No. 5,122,177 and US2015/0007612A1.

In one type of press bending process, a first bending tool may be designed as a ring-type female mould corresponding to a perimeter of a heated glass sheet to be bent, whilst an essentially solid male mould, also known as a full-faced mould, forms a second bending tool. To aid in the bending process a plurality of suction holes are placed in portions of the full-face mould, the position of which may be determined by a configuration of the annular mould and/or a geometry of the glass sheet to be bent, when the annular mould comes into contact with the heated glass sheet during the press bending process. The male mould may have a peripheral annular groove as described in U.S. Pat. No. 7,866,187B2 for applying suction therethrough.

The heated glass sheet to be bent is heated to the bending temperature in an associated furnace and moved between the full-faced mould and the ring-type mould while in a formable state. The heated glass sheet is typically transferred between the moulds using a series of rollers, a portion of which may move vertically to place the heated glass sheet onto the ring-type mould. At least two stops, which may be moved vertically to avoid interference with the full-faced mould, facilitate positioning the heated glass sheet in a direction of travel between the moulds. During or immediately after placing the heated glass sheet onto the ring-type mould, the full-faced mould and the ring-type mould are then moved toward one another to perform the pressing process. During the pressing process, the full-face mould presses the glass sheet onto the ring-type mould. It is understood however, that either the full-faced mould or the ring-type mould may be fixed and only the remaining mould will move. As a result, a shaping of the edges of the heated glass sheet takes place. Simultaneously, the middle area of the heated glass sheet is held against the moulding face using a vacuum to perform further shaping. These shaping procedures take place in a relatively quick manner, since the glass sheet cools down rapidly, and after a short time the edges of the glass sheet fall below an optimal bending temperature.

Following opening of, and removal from, the bending tools, the glass sheet should possess a desired shape, be dimensionally stable, and not be optically distorted. Otherwise, the bending process results in waste or products that possess poor quality. One such factor that may result in waste or products that possess poor quality is a positioning of the heated glass sheet on the ring-type mould during a press bending process of the type as hereinbefore described.

As mentioned hereinabove, vertically movable stops facilitate positioning the heated glass sheet in the direction of travel between the moulds. However, positioning of the heated glass sheet in other directions, such as substantially perpendicular to the direction of travel between the moulds, is only performed on the rollers, prior to entry of the glass sheet into the furnace. Consequently, alignment of the glass sheet during the bending process on the first bending tool may not be ideal, resulting in waste or products that possess poor quality.

Examples of glass positioning devices used in glass bending operations are described in U.S. Pat. Nos. 4,666, 492, 4,838,920, 5,017,210 and 5,743,931.

In general, when a glass is supported on a first bending tool for bending thereon, if the glass sheet is not positioned correctly the glass sheet may not have the desired properties after bending. This is applicable for shaping a glass sheet by press bending or gravity sag bending.

Glass sheets having a coating on a major surface thereof are well known. The coating is usually applied to the glass sheet during the forming process, or is applied to the glass sheet after the glass sheet has been formed.

For example, the coating may be applied to the glass sheet using an atmospheric chemical vapor deposition when a glass ribbon is formed in a float bath forming process. Such a coating process is often referred to as an "on-line" coating process in the art.

It is also known to apply coatings to glass sheets using a sputtering technique, such as magnetron sputtering. Such processes are often referred to as "off-line" coating processes in the art.

The glass sheet may also have a coating thereon in the form of a layer of ink that is used to provide the glass sheet with an obscuration band. Such an ink is typically optically opaque and black in colour. In the field of automotive glazings, obscuration bands are well known and are typically provided at selected regions of the glass sheet, in particular around the edges of the glass sheet in the shape of a continuous band. For example, for a vehicle windscreen the obscuration band provides an aesthetic feature and also helps prevent damage to adhesive used to fix the windscreen in the vehicle aperture and to other components due to exposure to ultra violet radiation from the sun. The obscuration band may also have a fade out region, where the ink is usually provided as an array of dots to provide the edge of the obscuration band with a less abrupt appearance.

The provision of the coating provides the glass sheet with additional functionality. Often in the art, such coatings are referred to as "functional coatings".

Functional coatings include low-emissivity coatings, conductive coatings and solar control coatings.

A low emissivity coating (often referred to as a "low-e" coating) is a coating which when applied to clear, 3 mm thick float glass, results in the coated glass having an emissivity in the range of typically 0.05 to 0.45, the actual value being measured in accordance with EN 12898 (a published standard of the European Association of Flat Glass Manufacturers). Such a low emissivity coating prepared using an "on-line" process typically has an emissivity between 0.15 and 0.2, whereas such a coating prepared using an "off-line" process generally has an emissivity of 0.05 to 0.1. As a comparison, uncoated 3 mm thick float glass has an emissivity of 0.89 and polished silver has an emissivity of around 0.01.

A low emissivity coating prepared using an "on-line" process may comprise a single layer of a metal oxide, preferably a transparent, electrically conductive oxide. Oxides of metals such as tin, zinc, indium, tungsten and molybdenum may be present in the metal oxide layer. Typically, the coating comprises a further dopant, such as fluorine, chlorine, antimony, tin, aluminium, tantalum, niobium, indium or gallium, for example, fluorine-doped tin oxide or tin-doped indium oxide may be used. Such coatings are generally provided with an underlayer, such as silicon or silicon oxynitride. The underlayer acts as a barrier to control migration of alkali metal ions from the glass and/or to suppress iridescent reflection colours caused by variations in thickness of the low emissivity layer.

A low emissivity coating prepared using an "off-line" process typically comprises a multilayer coating stack, normally including at least one metal layer or electrically conductive metal compound layer, and a dielectric layer. Silver, gold, copper, nickel or chromium may be used as the metal layer, whereas indium oxide, antimony oxide or the like may be used as the electrically conductive compound. Typical multilayer stacks comprise one or two layers of silver deposited between layers of a dielectric such as an oxide of silicon, aluminium, titanium, vanadium, tin, or zinc. Individual layers of such coatings are typically tens of nanometres in thickness. Such low emissivity coatings may comprise three, or four layers of silver.

Typical solar control coatings comprise layers of silver or tin oxide, and control the amount of heat absorbed through the coated glass. Solar control and low emissivity coatings may also be electrically conductive, and so not only provide functionality to the glass in terms of emissivity and heat transmission, but can form an electrically conductive substrate for mounting electrically conductive devices such as LEDs, sensors and cameras.

A glass sheet may also be provided with a heat reflective solar control coating, for example, a two-layer silver coating. Typically, the solar heat reflected by such coatings is greater than 23%, measured in accordance with IS09050:E (2003), air mass 1.5.

When a glass sheet provided with a coating is to be shaped using a process as described above, usually the side of the glass sheet having the coating thereon is not in contact with conveyor rollers used to convey the glass sheet through the heating furnace. Such contact of the coating with the conveyor rollers may damage the coating leading to an optically inferior product. The coated side therefore usually faces upwards i.e. away from the conveyor rollers, as the coated glass sheet is conveyed through the heating furnace.

It is known that glass sheets having a low emissivity coating on a major surface thereof are difficult to heat up, see for example "Glass Processing Days, 13-14 Sep. '97, ISBN 952-90-8959-7". Using a conventional radiation type heating furnace, the low emissivity coating reflects the radiative heat causing a non-uniform temperature gradient through the glass which cause the glass to bend during the heating cycle. The curvature acquired by such a low-emissivity coated glass sheet is sufficient to cause the portions of the coated glass sheet to at least partially lose contact with the conveyor rollers. This may cause the coated glass sheet to rotate on the conveyor rollers upon being conveyed through the heating furnace.

Similar effects are observed when a low-emissivity coating is used in combination with a coating in the form of a printed ink used to provide the glass sheet with an obscuration band. The optically opaque nature of the ink used to provide the obscuration band, which is usually black in colour, is able to absorb heat (in particular radiative heat) better than the low-emissivity coating. This also affects the nature of the thermal gradient that is produced in the coated glass sheet upon being conveyed through the heating furnace, resulting in a different degree of curvature being imparted to the coated glass sheet upon conveyance through the heating furnace.

A similar effect is also observed if the coating on the glass sheet is in the form of an obscuration band around the edges of the glass sheet. The ability of the optically opaque, typically black, obscuration band to absorb radiative heat is different compared to the uncoated glass, and this also results in temperature gradients being set up in the glass sheet which produces a similar bending effect as the glass sheet with obscuration band thereon is conveyed through the heating furnace.

The slight curvature imparted to the coated glass sheet upon passing through the heating furnace on the conveyor rollers, and the subsequent rotation of the glass sheet causes a problem.

For secondary processing, such as a shaping process, it is important that the coated glass sheet after being conveyed through the heating furnace is at a target position for suitable shaping. The slight curvature imparted to the low emissivity coated glass sheet and subsequent rotation of the coated glass sheet causes a variation in the position of the coated glass sheet upon conveyance through the furnace. Upon exiting the heating furnace for subsequent bending, the position of the coated glass sheet is shifted such that the coated glass sheet is not at the target or desired position for subsequent shaping. Due to the random nature of the rotation, attempts to offset the shift in position by a positional offset being applied to the position of the coated glass sheet on the conveyor system prior to being conveyed through the heating furnace are not able to reliably compensate for the subsequent positional shift.

Similar positional shifts may be also occur when the coated glass sheet is conveyed by other means such as air flotation.

It would be advantageous to develop a method for shaping a coated glass sheet that at least partially overcomes the aforementioned problems.

Accordingly the present invention provides from a first aspect a method for shaping a coated glass sheet comprising the steps: (i) providing a coated glass sheet having a first coating on a least a portion of a first major surface thereof, the coated glass sheet having an opposing second major surface; (ii) positioning the coated glass sheet at an entrance to a heating furnace; (iii) conveying the coated glass sheet through the heating furnace to heat the coated glass sheet to a temperature suitable for shaping; (iv) depositing the coated glass sheet on a first bending tool for supporting the coated glass sheet thereon, the coated glass sheet being in a first position relative to the first bending tool; (v) contacting a first portion of the coated glass sheet such that the coated glass sheet is moved to a second position relative to the first bending tool; and (vi) shaping the coated glass sheet on the first bending tool.

By adjusting the position of the coated glass sheet after being deposited on the first bending tool and before being shaped on the first bending tool, the position of the coated glass sheet is adjusted late in the bending process, shortly before being shaped such that the time available for the coated glass sheet to further deviate away from a target position on the first shaping tool is minimized.

In carrying out the method according to the first aspect of the present invention, step (iv) occurs before step (v).

In some embodiments after the coated glass sheet has been deposited on the first bending tool during step (iv), the coated glass sheet is disposed over a first segment of the first bending tool, the first segment at least partially defining a shaping surface of the first bending tool; and wherein in step (v) moving the first segment of the first bending tool from a first position to a second position causes contact with the first portion of the coated glass sheet, the contact with the first portion of the glass sheet adjusting a position of the glass sheet relative to the shaping surface of the first bending tool.

Preferably movement of the first segment of the first bending tool from the first position to the second position is in a direction which is toward a second segment of the first bending tool.

Preferably the method further comprises moving the first segment from the second position to the first position prior to the coated glass sheet being disposed over the first segment of the first bending tool.

Preferably the method further comprises adjusting the position of the coated glass sheet relative to the shaping surface of the first bending tool prior to depositing the coated glass sheet on the first bending tool.

Preferably movement of the first segment of the first bending tool from the first position to the second position is in a direction which is perpendicular to a direction of coated glass travel.

Preferably the first portion of the coated glass sheet is a first pillar edge portion of the coated glass sheet and after moving the first segment of the first bending tool from the first position to the second position the first pillar edge of the coated glass sheet abuts an end surface of a first positioning assembly.

Preferably the first portion of the coated glass sheet is contacted by a first positioning assembly, the first positioning assembly moving with the first segment and in a direction which is toward the coated glass sheet prior to contacting the first portion of the coated glass sheet.

Preferably the first portion of the coated glass sheet is contacted by a first positioning assembly and a second positioning assembly, the first positioning assembly and the second positioning assembly being spaced apart from each other, wherein the first positioning assembly and the second positioning assembly each move with the first segment and in a direction which is toward the glass sheet prior to contacting the glass sheet, more preferably wherein the first positioning assembly comprises a body portion which is configured to move vertically in an upward direction or a downward direction. Preferably the body portion moves vertically in the downward direction prior to press bending the glass sheet between the first bending tool and a second bending tool and preferably comprises contacting an upper surface of the body portion with the second bending tool to move the body portion in the downward direction, or the body portion moves vertically in the upward direction after press bending the glass sheet between the first bending tool and a second bending tool.

Preferably the method further comprises moving a second segment of the first bending tool from a first position to a second position to cause contact with a second portion of the coated glass sheet, the contact with the second portion of the coated glass sheet adjusting the position of the coated glass sheet relative to the shaping surface of the first bending tool, wherein movement of the second segment of the first bending tool from the first position to the second position is in a direction which is toward the first segment of the first bending tool.

Preferably the second segment of the first bending tool from a first position to a second position to cause contact with a second portion of the coated glass sheet, the contact with the second portion of the coated glass sheet adjusting the position of the coated glass sheet relative to the shaping surface of the first bending tool, wherein movement of the first segment of the first bending tool and movement of the second segment of the first bending tool is in a direction which is perpendicular to a direction of coated glass travel.

Preferably the method further comprises moving a third segment of the first bending tool from a first position to a second position to cause contact with a third portion of the coated glass sheet, the contact with the third portion of the coated glass sheet adjusting the position of the coated glass sheet relative to the shaping surface of the first bending tool, wherein movement of the third segment of the first bending tool is in a direction which is perpendicular to a direction of movement of the first segment and is toward a fourth segment of the first bending tool.

Preferably the method further comprises disposing the coated glass sheet over a fourth segment of the first bending tool.

Preferably disposing the glass sheet over the fourth segment of the first bending tool causes contact with a fourth portion of the coated glass sheet to adjust the position of the coated glass sheet relative to the shaping surface of the first bending tool.

Preferably the first segment, second segment, third segment, and fourth segment are configured as a ring which supports the coated glass sheet in a peripheral region thereof.

Preferably the coated glass sheet is also disposed over the second segment of the first bending tool and the third segment of the first bending tool and the first segment of the first bending tool, second segment of the first bending tool, third segment of the first bending tool, and fourth segment of the first bending tool each define a discrete portion of the shaping surface.

Preferably the fourth segment of the first bending tool does not move toward the third segment of the first bending tool Preferably the fourth segment of the first bending tool is fixed and is not movable relative to the first, second or third segments of the first bending tool.

Preferably the fourth portion of the coated glass sheet is a leading edge portion of the coated glass sheet and the leading edge portion of the coated glass sheet is contacted by a stopper to regulate the position of the coated glass sheet relative to the shaping surface of the first bending tool and after contact with the leading edge portion of the coated glass sheet the stopper moves away from the leading edge portion of the coated glass sheet, preferably wherein the stopper moves away from the leading edge portion of the coated glass sheet vertically in a downward direction or in a direction of glass travel.

In some embodiments the first bending tool comprises at least one shaping rail having an upper shaping surface for supporting the glass sheet thereon.

Preferably the first bending tool comprises a ring configured to support the glass sheet in a peripheral region thereof. The ring may have a continuous upper shaping surface.

Preferably during step (v) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the first portion of the coated glass sheet and move the coated glass sheet from the first position to the second position.

In some embodiments during step (vi), the coated glass sheet is shaped on the first bending tool by press bending the coated glass sheet between the first bending tool and a second bending tool.

As is known in the art, press bending is a shaping process in which a heat-softened glass sheet is pressed between complementary opposed shaping surfaces which are provided on press members such as first and second bending tools.

Preferably during step (vi) the first bending tool does not move relative to a fixed reference point and the second bending tool moves relative to the fixed reference point towards the first bending tool to press bend the coated glass sheet between the first bending tool and the second bending tool.

Preferably during step (vi) the second bending tool does not move relative to a fixed reference point and the first bending tool moves relative to the fixed reference point towards the second bending tool to press bend the coated glass sheet between the first bending tool and the second bending tool. Preferably during step (vi) both the first and second bending tools move towards each other to press bend the coated glass sheet between the first bending tool and the second bending tool.

Preferably during step (vi) the glass sheet is shaped on the first bending tool by moving the first bending tool with the coated glass sheet thereon relative to the second bending tool to press at least one portion of the coated glass sheet between at least one portion of the first bending tool and at least one portion of the second bending tool.

Preferably the second bending tool has a convex shaping surface and the first bending tool has a complementary concave shaping surface.

Preferably the second bending tool is a full-faced mould.

Preferably the second bending tool comprises at least two portions (a first portion and a second portion), more preferably wherein the first portion of the second bending tool is movable with respect to the second portion of the second bending tool. Preferably one part of the coated glass sheet is shaped between the first bending tool and the first portion of the second bending tool, and another part of the coated glass sheet is shaped between the first bending tool and the second portion of the second bending tool.

Preferably during step (vi) a vacuum is applied through one or more opening in the surface of the second bending tool.

In other embodiments during step (vi) the coated glass sheet is shaped by sagging under the influence of gravity whilst being supported on the first bending tool, optionally with the provision of an additional pressing force to shape selective areas of the coated glass sheet.

Other embodiments have other preferable features.

Preferably the first portion of the coated glass sheet is an edge portion of the coated glass sheet. Preferably the second major surface faces the conveying means.

During step (iii) the coated glass sheet is conveyed through the heating furnace in a direction of coated glass travel using suitable conveying means.

During step (iii) the coated glass sheet is conveyed through the heating furnace using conveying means.

Preferably the conveying means comprises one or more roller and/or one or more air flotation device. Preferably the conveying means comprises a plurality of spaced apart rollers.

Preferably during step (iv), the coated glass sheet is deposited on the first bending tool by moving the first bending tool relative to the coated glass sheet.

Preferably during step (iv), the coated glass sheet is deposited on the first bending tool by dropping the coated glass sheet onto the first bending tool. The coated glass sheet may be being carried by a vacuum platen prior to being dropped onto the first bending tool. A suitable vacuum platen is described in U.S. Pat. No. 6,422,040B1. The coated glass sheet may be supported on a heated gas cushion prior to being dropped onto the first bending tool, for example as described in U.S. Pat. Nos. 4,432,782, 5,078,776 and 6,505,483B1.

Preferably prior to step (iv) there is a target position for the coated glass sheet relative to the first bending tool for optimum shaping, and the first position is deliberately offset from the target position such that after step (iii) the second position of the coated glass sheet relative to the first bending tool is closer to the target position than the first position of the coated glass sheet relative to the first bending tool.

Preferably there is a target position for the coated glass sheet relative to the first bending tool for optimum shaping, and the second position of the coated glass sheet is closer to the target position than the first position of the coated glass sheet.

At step (iv) when the coated glass sheet is deposited on the first bending tool, the coated glass sheet may bounce thereon such that the first position of the coated glass sheet with respect to the first bending tool is transient until the coated glass sheet stops bouncing on the first bending tool. Preferably during step (v) there is no relative vertical movement between the coated glass sheet and the first bending tool. However, the coated glass sheet may be moved to the second position during step (v) whilst the coated glass sheet is bouncing on the first bending tool after having been deposited thereon.

Preferably the coated glass sheet is a single glass sheet or one sheet in a stack of glass sheets comprising at least two glass sheets, one or both of which is a coated glass sheet.

Preferably the coated glass sheet is a sheet in a nested pair of glass sheets, suitably spaced apart by a parting agent such as calcium carbonate.

The method according to the first aspect of the present invention provides the ability to correct the shift in position of the coated glass sheet after being conveyed through the heating furnace and after being deposited on the first bending tool. Any deviation of the position of the coated glass sheet on the first bending tool away from a target position thereon can be rectified accordingly. It will be readily apparent that if during step (iv) the coated glass sheet is deposited on the first bending tool such that adjustment of the position is not required, then the first portion of the coated glass sheet may not be contacted. In this situation there may be contact with the first portion of the coated glass sheet provided the second position of the coated glass sheet relative to the first bending tool is the same, or substantially the same, as the first position of the coated glass sheet relative to the first bending tool.

From a second aspect the present invention provides a method for aligning a hot coated glass sheet having a first coating on at least a portion of a first major surface thereof, the method comprising the steps of providing a coated glass bending operation, the coated glass bending operation including a first bending tool; providing a positioning device comprising a movable portion positioned adjacent the first bending tool, a fixed portion positioned adjacent the movable portion, and an actuator disposed between the fixed portion and the movable portion; disposing the hot coated glass sheet on the first bending tool; engaging the actuator to cause the movable portion to move with respect to the fixed portion; and contacting a first portion of the coated glass sheet with the movable portion to adjust a position of the hot coated glass sheet with respect to the first bending tool.

Preferably the first portion is an edge portion of the coated glass sheet.

Preferably the first coating faces away from the first bending tool.

Preferably the movable portion comprises a pusher portion.

Preferably the movable portion comprises a pusher portion formed from a spring steel.

Preferably the pusher portion and/or the movable portion includes a contact material coupled thereto. Preferably the contact material is disposed on a pushing edge of the pusher portion.

Preferably a cross-sectional shape of the pusher portion and/or the movable portion includes an undulation.

Preferably the cross-sectional shape of the pusher portion and/or the movable portion includes two undulations.

Preferably the step of providing the glass bending operation includes providing the first bending tool and a second bending tool.

Embodiments of the second aspect of the present invention where the coated glass bending operation includes providing the first bending tool and a second bending tool have other preferable features.

Preferably the movable portion comprises a pusher portion and a thickness of the pusher portion is less than a minimum distance between the first bending tool and the second bending tool.

Preferably the method of the second aspect of the present invention further comprises after the step of disposing the hot coated glass sheet on the first bending tool, the step of moving one of the first bending tool and the second bending tool towards a remaining one of the first bending tool and the second bending tool after the step of disposing the hot coated glass sheet on the first bending tool.

Preferably the movable portion comprises a pusher portion having a cross-sectional shape including an undulation, and the step of moving one of the first bending tool and the second bending tool towards a remaining one of the first bending tool and the second bending tool compresses the pusher portion therebetween.

Preferably the method of the second aspect of the present invention further comprises after the step of disposing the hot coated glass sheet on the first bending tool, the step of moving the first bending tool towards the second bending tool whilst the second bending tool is moving towards the first bending tool.

Preferably the movable portion comprises a pusher portion having a cross-sectional shape including an undulation, and the step of moving the first bending tool towards the second bending tool whilst the second bending tool is moving towards the first bending tool compresses the pusher portion therebetween.

Embodiments of the second aspect of the present invention have other preferable features.

Preferably the coated glass sheet is conveyed through the coated glass bending operation in a direction of coated glass travel using suitable conveying means.

Preferably a second major surface of the coated glass sheet faces a conveying means, the conveying means being for conveying the coated glass sheet towards or away from the first bending tool.

Preferably the coated glass sheet is disposed on the first bending tool by dropping the coated glass sheet onto the first bending tool. The coated glass sheet may be being carried by a vacuum platen prior to being dropped onto the first bending tool. The coated glass sheet may be supported on a heated gas cushion prior to being dropped onto the first bending tool.

Preferably disposing the hot coated glass sheet on the first bending tool there is a target position for the hot coated glass sheet relative to the first bending tool for optimum shaping, and after the position of the hot coated glass sheet has been adjusted the position thereof is closer to the target position.

When the hot coated glass sheet is disposed on the first bending tool, the hot coated glass sheet may bounce thereon such that the position of the hot coated glass sheet with respect to the first bending tool is transient until the hot coated glass sheet stops bouncing on the first bending tool. Preferably when the actuator is engaged there is no relative vertical movement between the ho coated glass sheet and the first bending tool. However, the position of the hot coated glass sheet may be adjusted whilst the hot coated glass sheet is bouncing on the first bending tool after having been disposed thereon.

Preferably the hot coated glass sheet is a single glass sheet or one sheet in a stack of glass sheets comprising at least two glass sheets, one or both of which is a coated glass sheet.

Preferably the hot coated glass sheet is a sheet in a nested pair of glass sheets, suitably spaced apart by a parting agent such as calcium carbonate.

In methods in accordance with the second aspect of the present invention including conveying means, it is preferred that the conveying means comprises one or more roller and/or one or more air flotation device. More preferably the conveying means comprises a plurality of spaced apart rollers.

Methods in accordance with the first and second aspects of the present invention have other preferable features.

Preferably the glass sheet that carries the coating has a soda-lime-silicate composition. A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2%.

Preferably the glass sheet that carries the coating has a borosilicate composition or an aluminosilicate composition.

Preferably the coated glass sheet has a thickness between 0.5-25 mm, more preferably a thickness between 0.5-8 mm.

Preferably the first coating comprises a low emissivity coating.

Preferably the first coating is a low emissivity coating having an emissivity between about 0.03 and 0.45, or about 0.04 and 0.45, or about 0.05 and 0.45.

Preferably the first coating is over the entire first major surface of the coated glass sheet.

Preferably the first coating has one or more aperture therein, and preferably at least one of the apertures has an obscuration band around a periphery thereof.

Preferably the first coating comprises an optically absorbing layer Preferably the first coating comprises an optically opaque layer.

Preferably the first coating is used to provide the glass sheet with an obscuration band.

Preferably the heating furnace comprises at least one radiative heating means and/or at least one convective heating means.

Preferably during step (iii) at least a portion of the heat is provided by convection.

Preferably the method includes including a monitoring step for monitoring the position of the coated glass sheet on the first bending tool to provide an output, wherein the output is used to provide an input for moving the or a subsequent coated glass sheet from the first position to the second position.

In some embodiments of the first and/or second aspects of the present invention the coated glass sheet comprises a second coating on the first coating.

Preferably the first coating is a low emissivity coating and the second coating is a coating for providing the glass sheet with an obscuration band or region.

Preferably the first coating is a coating for providing the glass sheet with an obscuration band or region and the second coating is a low emissivity coating.

In embodiments of the first and/or second aspects of the present invention where the coated glass sheet comprises an obscuration region or band, preferably the coating for providing the glass sheet with an obscuration region or band is optically opaque and/or is black and/or is a printed ink.

Such a coating may be screen printed or dot matrix printed or sprayed.

Preferably the obscuration band extends as a band around the entire periphery of the first major surface of the coated glass sheet.

In some embodiments of the first and/or second aspects of the present invention it is preferred that the first coating comprises at least one layer of silver, preferably at least two layers of silver, more preferably at least three layers of silver, even more preferably at least four layers of silver.

The present invention also provides from a third aspect a shaping line for shaping a coated glass sheet comprising a furnace for heating the coated glass sheet to a temperature suitable for shaping; conveyor means for conveying the coated glass sheet through the furnace; and a coated glass sheet shaping section comprising a first bending tool for supporting the glass sheet thereon during a coated glass bending operation and at least one (a first) positioning device arranged relative to the first bending tool; characterised in that when a coated glass sheet is supported on the first bending tool the first positioning device is movable from a first configuration to a second configuration to contact a first portion of the coated glass sheet on the first bending to adjust the position of the coated glass sheet on the first bending tool.

Upon adjusting the position of the glass sheet on the first bending tool, the position of the glass sheet on the first bending tool is moved from a first position relative to the first bending tool to a second position relative to the first bending tool.

Preferably the first portion of the coated glass sheet is an edge portion of the coated glass sheet. Preferably the glass shaping line further comprises transfer means for transferring the coated glass sheet from the conveyor means onto the first bending tool. The transfer means is used to deposit the coated glass sheet on the first bending tool.

Preferably the transfer means comprise one or more roller and/or a vacuum platen and/or flotation on a heated gas cushion.

Preferably the first bending tool is configured as a ring to support the coated glass sheet in a peripheral region thereof.

Preferably the coated glass sheet shaping section comprises a second bending tool configured to co-operate with the first bending tool to shape the coated glass sheet therebetween.

Suitably the coated glass sheet shaping section is a press bending section comprising a pair of complementary shaping members.

Preferably the furnace comprises at least one radiative heating means.

Preferably the furnace comprises at least one convective heating means.

In some embodiments of the third aspect of the present invention, the shaping line comprises a monitoring system for monitoring the position of the coated glass sheet on the first bending tool.

Preferably the monitoring system is configured for monitoring the position of the coated glass sheet before the position of the coated glass sheet is adjusted on the first bending tool.

Preferably the monitoring system is configured for monitoring the position of the coated glass sheet after the position of the coated glass sheet is adjusted on the first bending tool.

Preferably the monitoring system is configured to provide an output, wherein the output is used to provide an input used for adjusting the position of the or a subsequent coated glass sheet on the first bending tool.

Preferably the monitoring system is in communication with a control system to control the movement of at least the first positioning device for adjusting the position of a coated glass sheet, preferably when the coated glass sheet is positioned on the first bending tool.

Preferably the monitoring system comprises a camera.

In embodiments of the third aspect of the present invention where the shaping section comprises a second bending tool, preferably the second bending tool comprises at least two portions (a first portion and a second portion). Preferably the first portion of the second bending tool is movable with respect to the second portion of the second bending tool.

The present will now be described with reference to the following figures (not to scale) in which:

FIG. 4a shows a plan view of a coated glass sheet being conveyed through a heating furnace;

FIG. 4b is a side view of FIG. 4a;

FIG. 5 shows a plan view of a coated glass sheet having an obscuration band;

FIG. 6 shows a schematic representation of another coated glass shaping line (a press bending line) for carrying out a method according to an embodiment of the present invention;

FIG. 14 is a perspective view of an embodiment of a positioning assembly;

FIG. 15 is a plan view of the positioning assembly of FIG. 14;

FIG. 16 is a plan view of a portion of an embodiment of the bending tool and the positioning assembly of FIG. 14;

Figures 1, 2, 3:
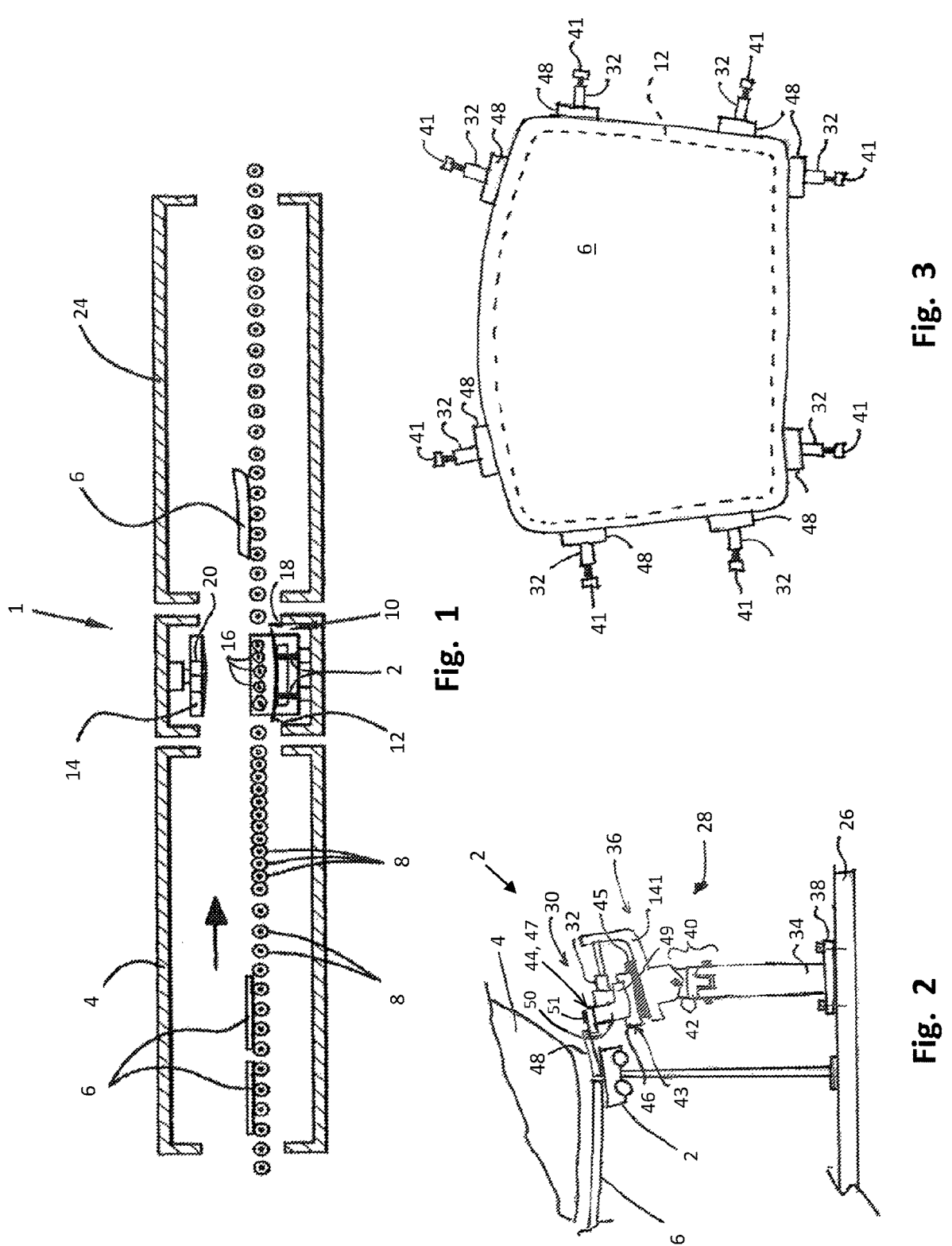
FIG. 1 shows a schematic representation of a coated glass shaping line (a press bending line) for carrying out a method according to an embodiment of the present invention.
FIG. 2 shows a portion of a first bending tool having a positioning device adjacent thereto.
FIG. 3 shows a plan view of a first bending tool supporting a coated glass sheet thereon with a plurality of positioning devices.

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

In certain embodiments, the glass sheet that carries the coating may have a soda-lime-silicate composition. A typical soda-lime-silicate glass composition is (by weight), $SiO_2$ 69-74%; $Al_2O_3$ 0-3%; $Na_2O$ 10-16%; $K_2O$ 0-5%; $MgO$ 0-6%; $CaO$ 5-14%; $SO_3$ 0-2% and $Fe_2O_3$ 0.005-2%. The glass composition may also contain other additives, for example, refining aids, which would normally be present in an amount of up to 2%. In other embodiments, the glass sheet that carries the coating may be of another composition. For example, the glass sheet that carries the coating may be of a borosilicate composition or an aluminosilicate composition. The coated glass sheet may have a thickness between 0.5-25 millimetres (mm), typically a thickness between 0.5-8 mm.

The shape of the coated glass sheet may vary between embodiments. However, in certain embodiments, the coated glass sheet may have a rectangular outline in plan view. The coated glass sheet has a first major surface and a second major surface. The second major surface opposes the first major surface. Also, the coated glass sheet may comprise a leading edge portion and a trailing edge portion. As used herein, an edge portion of the coated glass sheet may refer to a minor surface of the coated glass sheet that connects the first major surface to the second major surface. The coated glass sheet may comprise one or more edge portions. Each edge portion of the coated glass sheet can be flat or curved. Thus, the leading edge portion may refer to the minor surface of the coated glass sheet that connects the first major surface to the second major surface and is conveyed in a direction of coated glass travel in advance of the trailing edge portion. In an embodiment, the trailing edge portion is the longest minor surface of the coated glass sheet that connects the first major surface to the second major surface.

In this embodiment, the leading edge portion is of a length which is less than the length of the trailing edge portion. In other embodiments, the leading edge portion is the longest minor surface of the coated glass sheet that connects the first major surface to the second major surface and the trailing edge portion is of a length which is less than the length of the leading edge portion. Additionally, the coated glass sheet may comprise a first pillar edge portion and a second pillar edge portion. The first pillar edge portion and second pillar edge portion are disposed on opposite sides of the coated glass sheet. In an embodiment, the first pillar edge portion is a minor surface of the coated glass sheet that connects the first major surface to the second major surface. In another embodiment, the second pillar edge portion is a minor surface of the coated glass sheet that connects the first major surface to the second major surface.

FIG. 1 illustrates a coated glass shaping line 1 including a positioning device 2 for positioning a coated glass sheet prior to bending. The coated glass shaping line 1 includes a heating furnace 4, which serves to heat coated glass sheets 6. The coated glass sheets 6 are conveyed (transported) in a direction of coated glass travel 7 through the heating furnace 4 on rollers 8, a spacing of which may be reduced in the area of the exit of the heating furnace 4, since the coated glass sheets 6 in the heated state are deformable and therefore may require greater support.

The heating furnace 4 is followed by a bending station 10, which is provided with a first bending tool 12 and a second bending tool 14.

Figures 4A, 4B, 5, 6:
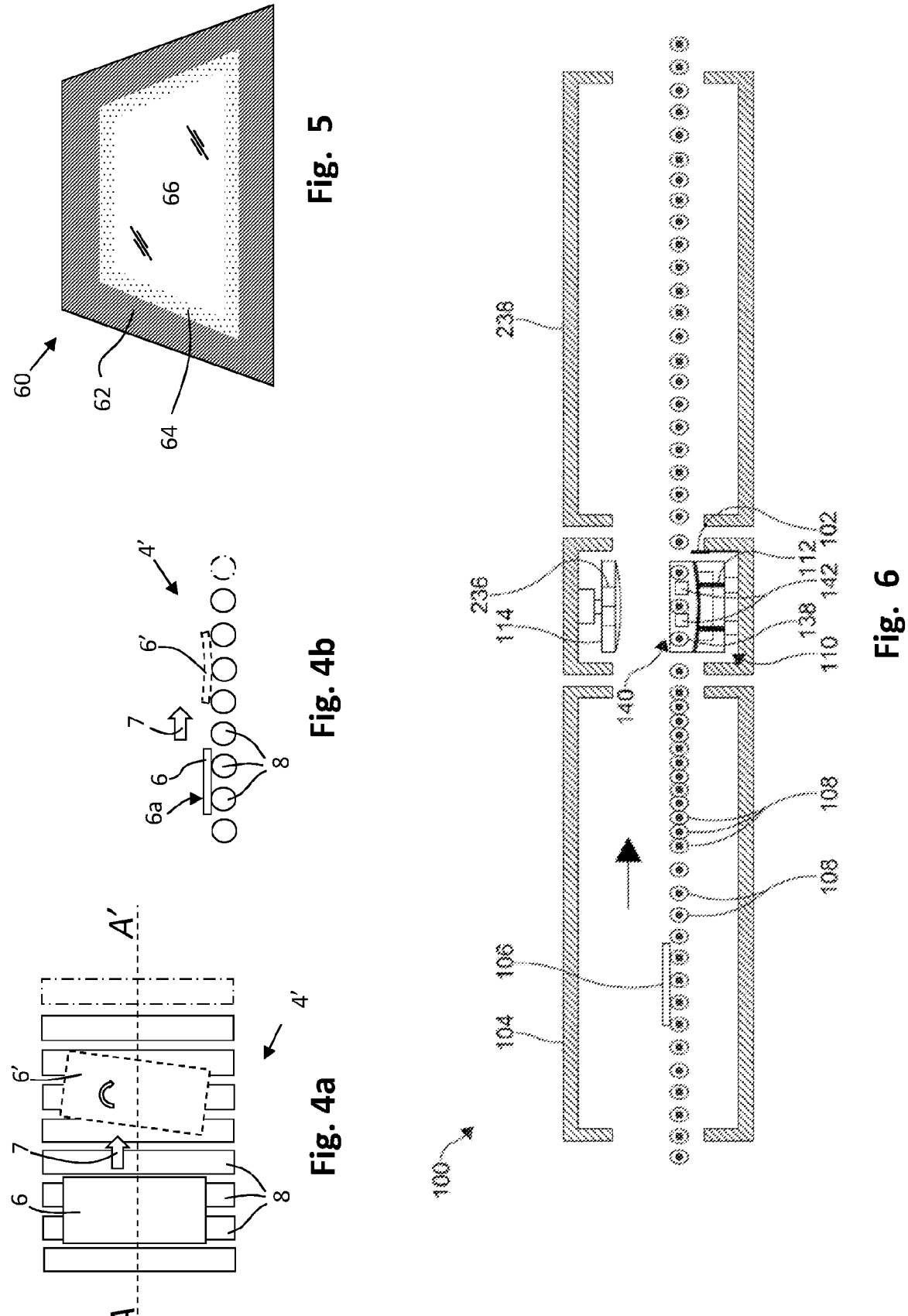

In the heating furnace 4, the coated glass sheet 6 may be heated to a temperature suitable for bending, which may be 590-670° C., by using suitable heating means, including radiation and convection. The coated glass sheet 6 is positioned on the rollers 8 to convey the coated glass sheet through the heating furnace 4. A portion of the heating furnace 4 is shown in FIGS. 4a and 4b and is labelled as 4'.

The coated glass sheet 6 is conveyed through the heating furnace 4 in the direction of coated glass travel 7.

There is a low emissivity coating on the upper facing major surface 6a of the coated glass sheet 6. The opposing major surface (not labelled) is uncoated and is in contact with the conveyor rollers 8. The low emissivity coating may include one or more layer of silver and/or may have an emissivity in the range of 0.03 to 0.45.

As the coated glass sheet 6 is heated up, it is difficult for the upper surface to get hot due to the presence of the low emissivity coating. The addition of convective heating is able to help improve heating, but the overall heat transfer to the coated glass sheet (due to radiation, convection and conduction from the rollers) results in temperature gradients being developed in the coated glass sheet causing the coated glass sheet to curve slightly. As the coated glass sheet curves slightly, the glass sheet may lose contact with the rollers 8 and this can cause the coated glass sheet to rotate, as illustrated by the rotated coated glass sheet 6' shown in phantom. For example, the lateral edges of the coated glass sheet 6 curve upwards thereby losing contact with the rollers 8 in that regions, whilst a central portion of the coated glass sheet remain in contact with a portion of the rollers 8.

The rotation of the coated glass sheet 6 means that upon entry into bending station 10 the coated glass sheet is not at the target position for suitable bending.

Referring back to FIGS. 1 and 2, the first bending tool 12 is a ring-type mould and the second bending tool 14 is a full-face mould. The bending station 10 includes a plurality of moveable rollers 16. The coated glass sheets 6 are transported onto the moveable rollers 16 from the rollers 8 as soon as the coated glass sheets 6 exit from the heating furnace 4. At least two stops 18, which may be moved vertically to avoid interference with the second bending tool 14, facilitate positioning the coated glass sheets 6 in a direction of travel between the first bending tool 12 and the second bending tool 14. At least two positioning devices 2, the structure and operation of which are described herein-below, may be used to facilitate positioning a coated glass sheet 6 on the first bending tool 12 when the coated glass sheet is between the first bending tool 12 and the second bending tool 14.

After being transported onto the plurality of moveable rollers 16, the plurality of moveable rollers 16 are moved in a downward direction to facilitate positioning the coated glass sheet 6 on the first bending tool 12 i.e. the coated glass sheet 6 is deposited on the first bending tool 12. A timing of the movement of the plurality of moveable rollers 16 is performed to carefully position the coated glass sheet 6 against the stops 18. Alternately, it is understood that the first bending tool 12 may be moved in an upward direction, lifting the coated glass sheet 6 from a set of rollers config-ured to remain in a stationary position, thereby depositing the coated glass sheet 6 on the first bending tool 12.

Once the coated glass sheet 6 is positioned on the first bending tool 12, the first bending tool 12 and the second bending tool 14 begin moving towards one another to perform a press bending of the coated glass sheet 6. During movement of the first bending tool 12 and the second bending tool 14 towards one another, the positioning devices 2 are used to position the coated glass sheet 6 on the first bending tool 12; however, it is understood that the position-ing devices 2 may be used to position the coated glass sheet 6 in any direction with respect to the first bending tool 12, such as positioning the coated glass sheets against the vertically movable stops (not shown). Following adjusting a position of the coated glass sheet 6 using the positioning devices 2, the coated glass sheet 6 is press bent between the first bending tool 12 and the second bending tool 14.

It will be immediately evident that the positioning devices may be used to position the coated glass sheet 6 on the first bending tool 12 whilst the first bending tool 12 and/or the second bending tool 14 are not moving and before the coated glass sheet has been press bent.

Also, for the avoidance of doubt, the first bending tool 12 may move towards the second bending tool 14, with the second bending tool not moving. Alternatively the second bending tool 14 may move towards the first bending tool 12, with the first bending tool 12 not moving. Alternatively the first bending tool 12 and the second bending tool 14 both are moving towards each other. In any of these alternatives the objective is to effect relative movement between the first bending tool 12 and the second bending tool 14 to press bend the coated glass sheet 6 between the first bending tool 12 and the second bending tool 14.

During pressing, a vacuum may be drawn on passages 20 formed in the second bending tool 14 to facilitate forming the coated glass sheet 6 into a desired shape. Upon comple-tion of shaping the coated glass sheet 6, the coated glass sheet 6 may be released from the second bending tool 14 by way of positive pressure being applied through the passages 20 of the second bending tool 14.

Upon completion of the bending process, a conveying device (not shown) serves to transport the shaped coated glass sheets 6 into a lehr 24. In the lehr 24, the shaped coated glass sheet 6 may be tempered or annealed as known in the art and cooled to a temperature at which handling can occur. The shaped coated glass sheet 6 may be used in the construction of a window for a vehicle, such as a windscreen, side window, sunroof or a rear window. Such a window may be monolithic or laminated.

The positioning devices 2 are most clearly illustrated in FIGS. 2 and 3. Each of the positioning devices 2 is an assembly mounted on a platform 26. The platform 26 is a rigid plate onto which the first bending tool 12 is adjustably mounted; however, it is understood that the positioning devices 2 may be mounted in another manner, as long as such a manner ensures a predetermined spatial relationship between each of the positioning devices 2 and the first bending tool 12. Each of the positioning devices 2 includes a fixed portion 28, a moveable portion 30, and an actuator 32. As shown in FIG. 3, a plurality of positioning devices 2 may be disposed about a peripheral edge of the first bending tool 12 to facilitate correcting for the rotation of the coated glass sheet 6 with respect to the first bending tool 12 after the heat softened coated glass sheet has been deposited on the first bending tool 12 and before the coated glass sheet has been press bent.

The fixed portion 28 is a rigid member coupled to the platform 26. The fixed portion 28 is formed from a plurality of metal components welded together, but it is understood that the fixed portion 28 may comprise components coupled to one another using a plurality of fasteners or that the fixed portion 28 may be unitary in shape. The fixed portion 28 comprises a first end 34 and a second end 36. The first end 34 includes a flanged portion 38 which is removably coupled to the platform 26 using a plurality of fasteners; however, it is understood that the first end 34 may have other shapes and may be coupled to the platform 26 in any conventional manner. The second end 36 includes a pivot portion 40 and a mount portion 41. The pivot portion 40 comprises a pair of orthogonally arranged knuckle joints 42 which the mount portion 41 is coupled to; however, it is understood that the pivot portion 40 may comprise another structure which facilitates the mount portion 41 being pivotally coupled thereto. The mount portion 41 is a rigid member coupled to the pivot portion 40. As shown in FIG. 2, the mount portion 41 is a rigid L-shaped member extending away from the pivot portion 40; however, it is understood that the mount portion 41 may have other shapes that allow a mounting of the actuator 32 in a manner where the actuator 32 can effect movement on the moveable portion 30.

The moveable portion 30 is an assembly movably coupled to the mount portion 41. The moveable portion 30 is formed from a plurality of components coupled together using a plurality of fasteners, but it is understood that the moveable portion 30 may comprise components welded to one another. The moveable portion 30 comprises a slide portion 43 and a pusher assembly 44.

The slide portion 43 is a linear slide comprising a guide rail 45 and a bearing block 46 engaged with the guide rail 45. The guide rail 45 is coupled to the mount portion 40 and the bearing block 46 is coupled to the pusher assembly 44. The bearing block 46 facilitates linear movement of the pusher assembly 44 along the guide rail 45. Alternately, it is understood that moveable portion 30 may be movably coupled to the mount portion 41 in another manner.

The pusher assembly 44 includes a pusher member 47 and a pusher portion 48. The pusher portion 48 is removably coupled to the pusher member 47 to facilitate replacement of the pusher portion 48 if needed.

The pusher member 47 is a substantially S-shaped mem-ber having a mount portion 49, an intermediate portion 50, and a pusher mount portion 51. The pusher member 147 comprises a pair of rigid metal members coupled to one another; however, it is understood that the pusher member may be unitarily formed and formed from other materials. The mount portion 49 is coupled to the bearing block 46. A portion of the actuator 32 is coupled to the intermediate portion 50 to effect movement to the pusher member 47, and thus the pusher assembly 44. The pusher mount portion 51 is positioned adjacent the first bending tool 12 and provides a location for mounting the pusher portion 48. The pusher mount portion 51 may include at least one threaded aperture formed therein for receiving fasteners which removably couple the pusher portion 48 to the pusher mount portion 51; however, it is understood that the pusher mount portion 51 may be configured in any manner that allows the pusher portion 48 to be removably coupled to the pusher mount portion 51.

The pusher portion 48 is a semi-rigid member formed from a sheet metal, such as a spring steel; however, it is understood that other materials having similar properties may also be used. Suitable pusher portions are described in WO2016/189319A1, in particular in FIGS. 4A-4D.

A suitable positioning device is also described in WO2016/189319A1 with particular reference to FIG. 5 thereof and the related description.

FIGS. 4a and 4b illustrate the rotation of a coated glass sheet 6 in a heating furnace 4. FIG. 4a is a plan view and FIG. 4b is a cross-sectional view along the line A-A'.

Although in FIGS. 4a and 4b the coated glass sheet 6 is shown having a rectangular outline in plan-view, FIG. 5 shows a plan view of another coated glass sheet 60 having a trapezoidal outline.

The coated glass sheet shown in FIG. 5 has an upper major surface and a lower major surface. On the upper major surface is a layer of heat curable ink i.e. a ceramic ink, in the form of a continuous band 62 extending around and inboard of the periphery of the underlying glass sheet. Such a layer is typically used to provide an obscuration band in a vehicle window such as a windscreen. Located inboard of the band 62 is another band 64 of disconnected portions of heat curable ink. The band 64 is typically provided as a fade-out band to avoid the otherwise abrupt edge of the band 62. Inboard of the band 64 the glass sheet is free of heat curable ink, the region 66 being the viewable region of the coated glass sheet.

The lower major surface of the coated glass sheet is free of heat curable ink. When the coated glass sheet 60 is conveyed on the rollers of a conveyor section (i.e. rollers 8 in FIG. 1), the lower major surface contacts the rollers.

The coated glass sheet 60 may be shaped in accordance with the present invention.

In an alternative to the coated glass sheet 60 just described, prior to the deposition of the heat curable ink to provide the obscuration band 62 and the fade-out band 64 on the upper major surface, the glass sheet had been provided with a low emissivity coating on the upper major surface.

Thereafter, the obscuration band 62 and the fade out band 64 were provided on the low emissivity coating. In this embodiment, the region 66 is provided with a low emissivity coating.

This type of coated glass may also suffer from the positional problems discussed herein. The low emissivity coating makes it difficult to heat the coated glass sheet, whereas the obscuration band can absorb heat much better. This also results in temperature gradients being developed in the coated glass sheet which can cause such a coated glass sheet to slightly curve when being conveyed through a heating furnace with the potential for the coated glass sheet to rotate as previously discussed.

In another alternative to the coated glass sheet 60 just described, after the deposition of the heat curable ink to provide the obscuration band 62 and the fade-out band 64 on the upper major surface, the glass sheet is provided with a low emissivity coating on the upper major surface. The low emissivity coating may be on one or more of the obscuration band 62, the fade out band 64 and the region 66.

This type of coated glass may also suffer from the positional problems discussed herein.

Other embodiments of a method of shaping a coated glass sheet are described herein and with reference FIGS. 6 to 20.

FIG. 6 illustrates another embodiment of a coated glass shaping line 100. In certain embodiments, the coated glass shaping line 100 is of the press bending variety. In other embodiments (not depicted), the coated glass shaping line is of the gravity bending variety.

The coated glass shaping line 100 includes a heating furnace 104. The heating furnace 104 serves to heat one or more coated glass sheets before bending of the coated glass sheet occurs. In the heating furnace 104, a coated glass sheet 106 is heated to a temperature suitable for shaping. For example, the coated glass sheet 106 may be heated to a temperature of 590-670° C. Accordingly, the coated glass sheet 106 may also be referred to as a heated coated glass sheet.

The coated glass sheet 106 is conveyed (i.e. transported) through the furnace 104 on rollers 108 in the direction of the arrow. The rollers 108 are spaced apart.

Figures 7, 8:
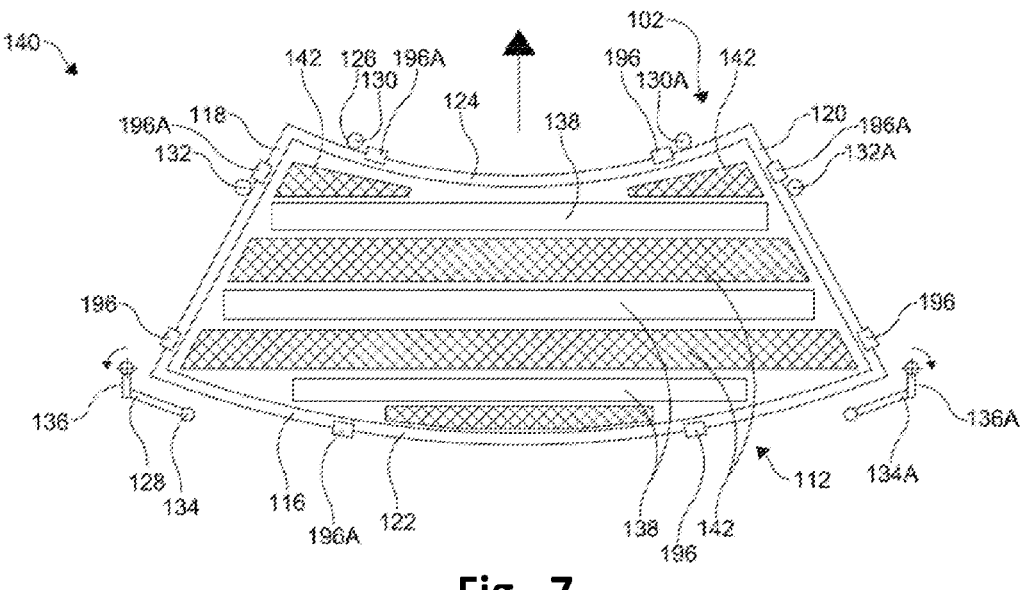
FIG. 7 is a plan view of a portion of the coated glass shaping line of FIG. 6.
FIG. 8 is a sectional view of a portion of an embodiment of the bending tool and the positioning assembly of FIG. 14, when the positioning assembly is in the first position, and a second bending tool.

The heating furnace 104 is followed by a bending station 110. The bending station 110 may include a centering device 102. The centering device 102 may be used to regulate positioning of the coated glass sheet 106 before it is deposited on the first bending tool 112. As shown in FIG. 7, when provided, the centering device 102 may comprise a plurality of positioners 126, 128. The positioners 126, 128 may be disposed about a peripheral edge of a first bending tool 112 to facilitate positioning of the coated glass sheet 106 relative to a shaping surface of the first bending tool 112 before the coated glass sheet 106 has been shaped.

As illustrated best in FIG. 7, a first positioner 126, which may be moved vertically in an upward direction and a downward direction, is configured to adjust the position of the coated glass sheet 106 relative to the shaping surface 116 of the first bending tool 112 before the coated glass sheet 106 is deposited on the first bending tool 112. In other embodiments (not depicted), the first positioner 126 is configured to adjust the position of the coated glass sheet 106 relative to the shaping surface 116 of the first bending tool 112 after the coated glass sheet 106 is deposited on the first bending tool 112. In an embodiment, the first positioner 126 may include one or more portions 130, 130A that contact the leading edge portion of the coated glass sheet 106. In another embodiment, the first positioner 126 may include separate portions 132, 132A that contact opposite sides of the coated glass sheet 106. The one or more portions 130, 130A of the first positioner 126 that contact the leading edge portion of the coated glass sheet 106 may also act as a stopper, which prevents the coated glass sheet 106 from moving beyond the first bending tool 112. After the coated glass sheet 106 is positioned, the portions 130, 130A, 132, 132A of the first positioner 126 contacting the coated glass sheet 106 may be moved away from the coated glass sheet 106 so as to not interfere with one or more of the bending tools 112, 114 during bending of the coated glass sheet 106. The centering device 102 may also comprise a second positioner 128. Preferably, the second positioner 128 is configured to adjust the position of the coated glass sheet 106 relative to the shaping surface 116 of the first bending tool 112 before the coated glass sheet 106 is deposited on the first bending tool 112. In another embodiment (not depicted), the second positioner 128 is configured to adjust the position of the coated glass sheet 106 relative to the shaping surface 116 of the first bending tool 112 after the coated glass sheet 106 is deposited on the first bending tool 112. In these embodiments, the second positioner 128 may include one or more portions 134, 134A that contact the trailing edge portion of the coated glass sheet 106 when the sheet is being positioned. The portions 134, 134A of the second positioner 128 contacting the trailing edge portion of the coated glass sheet 106 may each be attached to a pivot arm 136, 136A. After the coated glass sheet 106 is located entirely within the bending station 110, the pivot arms 136, 136A may rotate to bring the second positioner 128 into contact with the coated glass sheet 106. After the coated glass sheet 106 is positioned, the portions 134, 134A of the second positioner 128 contacting the coated glass sheet 106 may be rotated away from the coated glass sheet 106 so as to not interfere with one or more of the bending tools 112, 114 during bending of the coated glass sheet 106.

Referring back to FIG. 6, a plurality of rollers 138 are provided for conveying the coated glass sheet 106 to a location above the first bending tool 112. It is preferred that each roller of the plurality of rollers 138 rotates to convey the coated glass sheet 106 in a direction of coated glass travel, which is illustrated in FIG. 1 with respect to the glass shaping line 100 and in FIG. 7 with respect to a portion of the first bending tool 112. Also, it is preferred that the plurality of rollers 138 convey the coated glass sheet 106 at a height or distance above the first bending tool 112 when the first bending tool 112 is in a rest position. It may also be preferred that the height that the plurality of rollers 138 conveys the coated glass sheet 106 at is substantially constant.

Once the coated glass sheet 106 exits the heating furnace 104, the coated glass sheet 106 is transferred from the rollers 108 in the heating furnace 104 to the plurality of rollers 138. As illustrated in FIG. 7, in certain embodiments, the plurality of rollers 138 may comprise rollers that are of different lengths. In other embodiments (not depicted), the plurality of rollers may comprise rollers of substantially equal lengths. As illustrated in FIGS. 6 and 7, each roller of the plurality of rollers 138 is spaced apart from an adjacent roller. The spaces provided between the rollers may be equal in size. It is preferred that each roller of the plurality of rollers 138 is movable in that each roller can be moved vertically in a downward direction or in an upward direction.

In certain embodiments, the glass shaping line 100 comprises a fluid pad assembly 140. The fluid pad assembly 140 facilitates positioning the coated glass sheet 106 on the first bending tool 112 and transferring the coated glass sheet 106 from the plurality of rollers 138 to the first bending tool 112. The fluid pad assembly 140 comprises one or more fluid pads 142. It is preferred that a plurality of fluid pads 142 are provided. When a plurality of fluid pads 142 are provided, the fluid pads 142 may be configured as an array. The centering device 102, plurality of rollers 138, fluid pad assembly 140, and the fluid pads 142 may operate and be as described in WO2018/087572A1.

Referring back to FIG. 6, the bending station 110 includes the first bending tool 112 and, in certain embodiments, a second bending tool 114. It can be appreciated that the bending station 110 may comprise more bending tools 112, 114 than those shown in FIG. 6. Also, the bending tools 112, 114 shown in FIG. 6 may be oriented in a position other than the positions shown in FIG. 6.

The second bending tool 114 may be a male tool. In an embodiment, the second bending tool 114 is a full-face mould. In these embodiments, the second bending tool 114 may comprise a convex shaping surface 144. Suitable embodiments of the second bending tool 114 are also described in WO2016/189319 A1, the entire disclosure of which is hereby incorporated by reference.

The coated glass sheet 106 has a first major surface 146 and a second major surface 148. As illustrated in FIG. 8, after the glass sheet 106 is deposited on the first bending tool 112, the first major surface 146 of the glass sheet 106 faces the shaping surface 116 of the first bending tool 112. When a second bending tool 114 is provided, the second major surface 148 of the glass sheet 106 faces the shaping surface 144 of the second bending tool 114. There is a low emissivity coating on the second major surface 148.

The first bending tool 112 may be a female tool. In an embodiment, the first bending tool 112 is a ring-type mould. As illustrated best in FIG. 7, the first bending tool 112 may have a generally rectangular outline or periphery configured to support a glass sheet 106 also having a rectangular outline. The first bending tool 112 comprises a shaping surface 116, in particular a concave shaping surface. As used herein, the shaping surface 116 of the first bending tool 112 refers to the portion of the first bending tool 112 that the glass sheet 106 is deposited on and any position, configuration, or orientation thereof. More particularly, the first bending tool 112 comprises an upper shaping surface 116 for shaping and supporting the glass sheet 106 thereon. After the coated glass sheet 106 has been received by the first bending tool 112, the coated glass sheet 106 is supported on the shaping surface. The shaping surface 116 may be configured to support the coated glass sheet 106 in a peripheral region thereof.

The shaping surface 116 is at least partially defined by a first segment 118. In some embodiments, the shaping surface 116 is at least partially defined by a second segment 120. The first segment 118 is spaced apart from the second segment 120. In the embodiments described and illustrated, the first segment 118 will be described and depicted with reference to a segment of the first bending tool 112 which is configured to receive the first pillar edge portion of the glass sheet 106. However, it should be appreciated that the first segment 118 could refer to a segment of the first bending tool 112 configured to receive the trailing edge portion of the glass sheet 106 or the leading edge portion of the glass sheet 106. Once an edge portion of the glass sheet 106 is received, the first segment 118 is configured to support the edge portion of the glass sheet 106. Additionally, in certain embodiments, the second segment 120 will be described and depicted with reference to a segment of the first bending tool 112 which is configured to receive the second pillar edge portion of the coated glass sheet 106. However, it should be appreciated that the second segment 120 could refer to a segment of the first bending tool 112 configured to receive the trailing edge portion of the coated glass sheet 106 or the leading edge portion of the coated glass sheet 106. Once an edge portion of the coated glass sheet 106 is received, the second segment 120 is configured to support the edge portion of the coated glass sheet 106.

Positioned at one end of the first segment 118 and the second segment 120 is a third segment 122. More particularly, a first end of the third segment 122 is spaced apart from a first end of the first segment 118 and a second end of the third segment 122 is spaced apart from a first end of the second segment 120. When provided, the third segment 122 at least partially defines the shaping surface 116 of the first bending tool 112. In certain embodiments, the third segment 122 is configured to receive the trailing edge portion of the glass sheet 106. In these embodiments, once the trailing edge portion of the coated glass sheet 106 is received, the third segment 122 is configured to support the trailing edge portion of the coated glass sheet 106.

Positioned at another end of the first segment 118 and the second segment 120 is a fourth segment 124. More particularly, a first end of the fourth segment 124 is spaced apart from a second end of the first segment 118 and a second end of the fourth segment 124 is spaced apart from a second end of the second segment 120. When provided, the fourth segment 124 at least partially defines the shaping surface 116 of the first bending tool 112. In certain embodiments, the fourth segment is configured to receive the leading edge portion of the coated glass sheet 106. In these embodiments, once the leading edge portion of the coated glass sheet 106 is received, the fourth segment 124 is configured to support the leading edge portion of the coated glass sheet 106.

Preferably, when provided, the first segment, second segment, third segment, and fourth segment each define a discrete portion of the shaping surface 116 of the first bending tool 112. When the coated glass sheet 106 is supported on the shaping surface 116 of the first bending tool 112, the glass sheet 106 is disposed over the first segment 118, second segment 120, third segment 122, and fourth segment 124. The segments 118-124 may define the generally rectangular outline. In certain embodiments, the first segment 118, second segment 120, third segment 122, and fourth segment 124 are configured as a ring which supports the coated glass sheet 106 in a peripheral region thereof. However, the first bending tool 112 may have other configurations. For example, in an embodiment, the first segment 118 may not be provided in a parallel relationship with the second segment 120. In other embodiments, the third segment 122 may not be provided in a parallel relationship with the fourth segment 124. In still other embodiments, the outline of the first bending tool 112 may be trapezoidal or have other forms suitably configured to support the particular coated glass sheet to be shaped. Also, as is illustrated in FIG. 7, one or more of the segments 118-124 may comprise one or more curved portions.

One or more of the segments 118-124 are movable. As one or more of the segments 118-124 are movable and the segments 118-124 provided define the shaping surface 116 of the first bending tool 112, in certain embodiments, the shaping surface 116 of the first bending tool 112 also moves in whole or in part. Movement of one or more of the segments 118-124 enables the position of the coated glass sheet 106 to be adjusted relative to the shaping surface 116 of the first bending tool 112 after the coated glass sheet 106 has been deposited on the first bending tool 112 and before the glass sheet 106 is shaped. Such adjustment allows the rotational shift of the coated glass sheet upon being conveyed through the heat furnace 104 to be corrected to allow suitable shaping.

Preferably, two or more of the segments 118-124 are movable. More preferably, three of the segments 118-124 are movable. In this embodiment, the first segment 118, second segment 120, and third segment 122 may be movable and the fourth segment 124 may have a fixed position. However, in other embodiments (not depicted), each of the segments 118-124 is movable.

In an embodiment, the first segment 118 is movable. In this embodiment, it is preferred that the first segment 118 is movable and moves in a direction which is toward the second segment 120. It is also preferred that the first segment 118 is movable and moves in a direction which is away from the second segment 120. In certain embodiments, the direction in which the first segment 118 moves toward the second segment 120 is perpendicular to the direction of coated glass travel or the same direction as the direction of coated glass travel. Preferably, the first segment 118 moves from a first position to a second position and from the second position to the first position. It is preferred that when the first segment 118 moves from the first position to the second position or from the second position to the first position that the direction in which the first segment 118 moves is perpendicular to the direction of coated glass travel. Preferably, the coated glass sheet 106 is deposited on the first bending tool 112 when the first segment 118 is in the first position. Preferably, when the first segment 118 moves toward the second segment 120, the first segment 118 moves from the first position to the second position. Also, it is preferred that when the first segment 118 moves in a direction which is away from the second segment 120, the first segment 118 moves from the second position to the first position. It is also preferred that the first segment 118 is in the second position when the coated glass sheet 106 is shaped on the first bending tool 112. In some embodiments, the first segment 118 moves from the first position to the second position or from the second position to the first position in one second or less. In other embodiments, the first segment 118 moves from the first position to the second position or from the second position to the first position in a half-second or less.

Preferably, the second segment 120 is movable. When the second segment 120 is movable, it is preferred that the second segment 120 is movable and moves in a direction which is toward the first segment 118. It is also preferred that the second segment 120 is movable and moves in a direction which is away from the first segment 118. In certain embodiments, the direction in which the second segment 120 moves toward the first segment 118 is perpendicular to the direction of coated glass travel or the same direction as the direction of coated glass travel. In other embodiments, the second segment 120 is not movable toward the first segment 118. Preferably, the second segment 120 is movable and moves from a first position to a second position and from the second position to the first position. Preferably, when the second segment 120 moves toward the first segment 118, the second segment 120 moves from the first position to the second position. Also, it is preferred that when the second segment 120 moves in a direction which is away from the first segment 118, the second segment 120 moves from the second position to the first position. Preferably, the coated glass sheet 106 is deposited on the first bending tool 112 when the second segment 120 is in the first position. It is also preferred that the second segment 120 is in the second position when the coated glass sheet 106 is shaped on the first bending tool 112. In some embodiments, the second segment 120 moves from the first position to the second position or from the second position to the first position in one second or less. In other embodiments, the second segment 120 moves from the first position to the second position or from the second position to the first position in a half-second or less.

The movement of the first segment 118 and the movement of the second segment 120 may occur in a simultaneous manner. For example, in embodiments where the first segment 118 moves toward the second segment 120 in a direction which is perpendicular to the direction of coated glass travel and the second segment 120 moves toward the first segment 118 in a direction which is perpendicular to the direction of coated glass travel, the movement of the first segment 118 and the movement of the second segment 120 may occur at the same time. In some embodiments where the first segment 118 and the second segment 120 move at the same time, the first segment 118 and the second segment 120 may both be moving toward the coated glass sheet 106 after it has been deposited on the first bending tool 112. In other embodiments, the first segment 118 and the second segment 120 may both be moving away from the coated glass sheet 106 and/or each other after the coated glass sheet 106 has been shaped.

In an embodiment, the third segment 122 is movable. In this embodiment, it is preferred that the third segment 122 is movable and moves in a direction which is toward the fourth segment 124. It is also preferred that the third segment 122 is movable and moves in a direction which is away from the fourth segment 124. In certain embodiments, the third segment 122 moves toward the fourth segment 124 in a direction which is perpendicular to the direction of glass travel. However, it is preferred that the third segment 122 moves toward the fourth segment 124 in a direction which is the same as the direction of glass travel. The third segment 122 may also move in relation to other segments. For example, in some embodiments, the third segment 122 moves in a direction which is perpendicular to the direction in which the first segment 118 moves. In these embodiments, the third segment 122 may also move in a direction which is perpendicular to the direction in which the second segment 120 moves. Preferably, the third segment 122 is movable and moves from a first position to a second position and from the second position to the first position. Preferably, when the third segment 122 moves toward the fourth segment 124, the third segment 122 moves from the first position to the second position. Also, it is preferred that when the third segment 122 moves in a direction which is away from the fourth segment 124, the third segment 122 moves from the second position to the first position. Preferably, the glass sheet 106 is deposited on the first bending tool 112 when the third segment 122 is in the first position. It is also preferred that the third segment 122 is in the second position when the glass sheet 106 is shaped on the first bending tool 112. In some embodiments, the third segment 122 moves from the first position to the second position or from the second position to the first position in one second or less. In other embodiments, the third segment 122 moves from the first position to the second position or from the second position to the first position in a half-second or less.

In certain embodiments (not depicted), the fourth segment 124 is movable. In one such embodiment, it is preferred that the fourth segment 124 is movable and moves in a direction which is toward the third segment 122. It is also preferred that the fourth segment 124 is movable and moves in a direction which is away from the third segment 122. Preferably, when the fourth segment 124 moves toward the third segment 122, the fourth segment 124 moves from a first position to a second position. Also, it is preferred that when the fourth segment 124 moves in a direction which is away from the third segment 122, the fourth segment 124 moves from the second position to the first position. When the fourth segment 124 moves toward the third segment 122, it is preferred that the fourth segment 124 moves in a direction which is opposite the direction of coated glass travel. In some embodiments, the fourth segment 124 moves from the first position to the second position or from the second position to the first position in one second or less. In other embodiments, the fourth segment 124 moves from the first position to the second position or from the second position to the first position in a half-second or less.

In embodiments where the fourth segment 124 moves toward the third segment 122, the movement of the third segment 122 and the movement of the fourth segment 124 may occur in a simultaneous manner. For example, in embodiments where the third segment 122 moves toward the fourth segment 124 in the direction of coated glass travel and the fourth segment 124 moves toward the third segment 122 in the opposite direction, the movement of the third segment 122 and the movement of the fourth segment 124 may occur at the same time. In some embodiments where the movement of the third segment 122 and the movement of the fourth segment 124 occur at the same time, the third segment 122 and the fourth segment 124 may both be moving toward the glass sheet 106 at the same time after the coated glass sheet 106 has been deposited on the first bending tool 112. In other embodiments, the third segment 122 and the fourth segment 124 may both be moving away from the coated glass sheet 106 and/or each other at the same time after the coated glass sheet 106 has been shaped. In still another embodiment, the movement of the third segment 122 and the movement of the fourth segment 124 may occur in a simultaneous manner with the movement of the first segment 118 and the movement of the second segment 120.

However, in other embodiments, it may be preferred that the fourth segment 124 does not move toward the third segment 122. In these embodiments, the position of the coated glass sheet 106 may change with respect to the fourth segment 124 prior to shaping. For example, when the fourth segment 124 is configured to receive the leading edge portion of the coated glass sheet 106 and the third segment 122 moves in a direction toward the fourth segment 124 prior to the coated glass sheet 106 being shaped, the leading edge portion of the coated glass sheet 106 may move on the fourth segment 124 in the direction of coated glass travel from a first position to a second position. In these embodiments, the position of the fourth segment 124 may be fixed.

Preferably, when two or more segments 118-124 move prior to shaping the coated glass sheet 106, the segments 118-124 move toward the coated glass sheet 106 in a predetermined order. For example, prior to shaping the coated glass sheet 106, the first segment 118 and the second segment 120 may move toward each other and the coated glass sheet 106. In this embodiment, the first segment 118 and the second segment 120 may move toward each other and the coated glass sheet 106 at the same time as described above. Following movement of the first segment 118 and the second segment 120, the third segment 122 may move toward the fourth segment 124 and the coated glass sheet 106. However, in other embodiments, the first segment 118, second segment 120, and third segment 122 may move in another predetermined order. For example, in certain embodiments, the first segment 118, second segment 120, and third segment 122 may each move toward the coated glass sheet 106 at the same time. Alternatively, in other embodiments, the third segment 122 may move toward the fourth segment 124 and the coated glass sheet 106 before the first segment 118 and second segment 120 move toward each other and the coated glass sheet 106. In this embodiment, the first segment 118 and the second segment 120 may move toward each other and the coated glass sheet 106 at the same time. It is preferred that, when two or more segments 118-124 move toward the coated glass sheet 106 in a predetermined order prior to shaping the coated glass sheet 106, each segment that moves will have moved from its first position to its second position in a predetermined period of time. It is preferred that the predetermined period of time begins when one or more of the two or more segments 118-124 begin to move and ends when all of the two or more segments 118-124 that move toward the coated glass sheet 106 in the predetermined order have moved from a first position to a second position. Preferably, the predetermined period of time is two seconds or less.

In some embodiments each segment 118-124 that is movable, moves from its second position to its first position after the coated glass sheet 106 has been removed from the first bending tool.

In some embodiments each segment 118-124 that is movable may move from its second position to its first position after the coated glass sheet 106 has been removed from the first bending tool in a simultaneous manner or in another predetermined order.

In some embodiments each segment 118-124 that is movable, moves from its second position to its first position after the coated glass sheet 106 has been shaped.

In some embodiments each segment 118-124 that is movable may move from its second position to its first position after the coated glass sheet 106 has been shaped in a simultaneous manner or in another predetermined order.

The vertical position of each segment 118-124 can be regulated utilizing one or more supports 150. The vertical position of a particular segment 118-124 may be regulated to compensate for changes in the segment or another segment caused by the heating and cooling of the first bending tool 112. The one or more supports 150 each have a length that can be modified. As each segment 118-124 has one or more supports 150 attached thereto, modifying the length of at least one of the one or more supports 150 regulates the position of the segment. The position of a segment is regulated in a vertical direction by increasing or decreasing the length of the one or more supports 150 that are attached to the segment.

Figure 9:
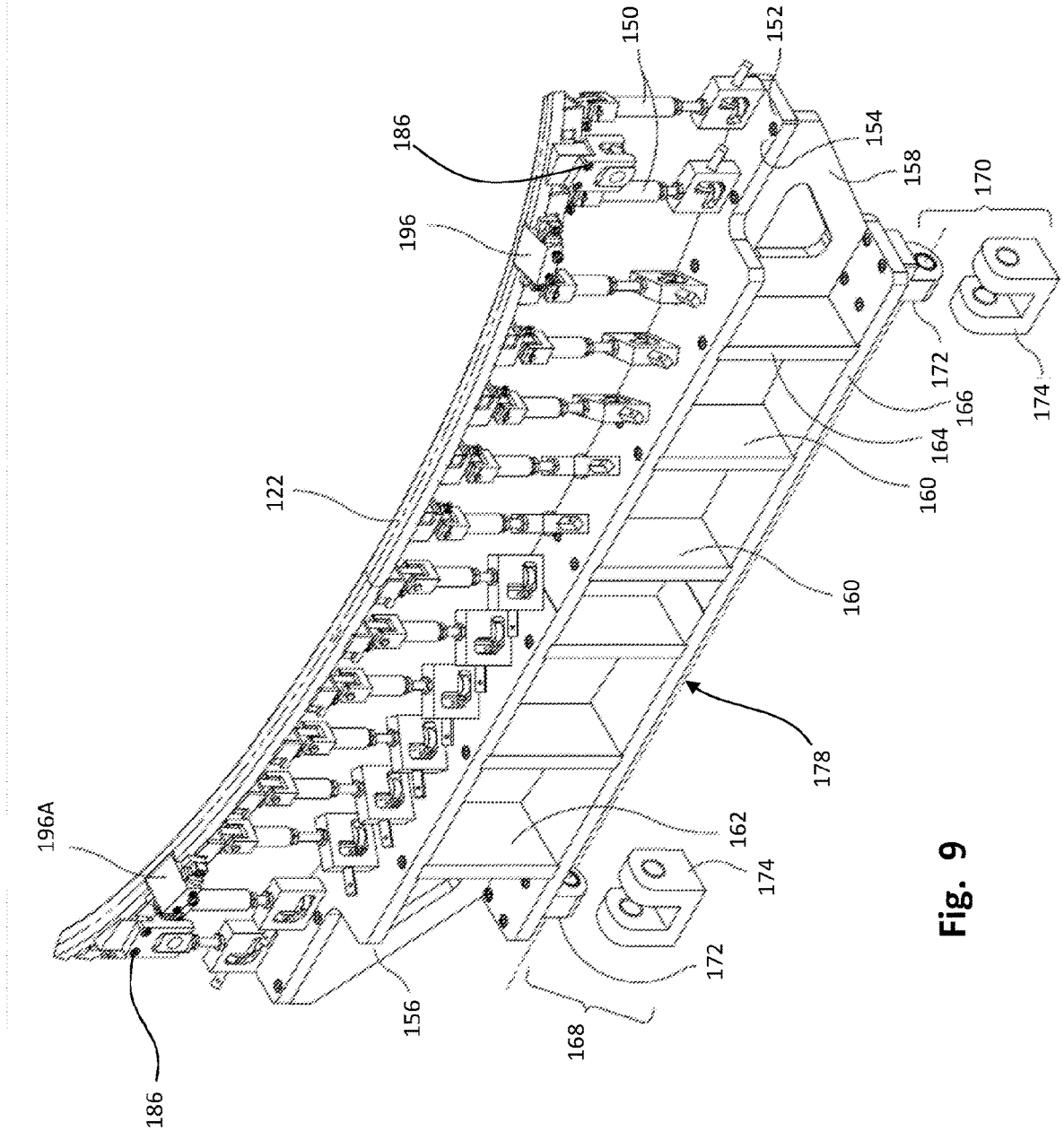
FIG. 9 is a perspective view of a portion of the bending tool shown in FIG. 10.

The one or more supports 150 will now be described with reference to the third segment 122, which is illustrated in FIG. 9, and a base member 152. It should be appreciated that the description provided below for the third segment 122, the one or more supports 150, and base member 152 could also apply to the one or more supports 150 attached to each of the first segment 118, second segment 120, and fourth segment 124 and respective base members connected to each of the first segment 118, second segment 120, and fourth segment 124.

Referring now to FIG. 9, each support of the one or more supports 150 is attached to the third segment 122 and, on an opposite end, each support of the one or more supports 150 is attached to the base member 152. The base member 152 may comprise an upper flange 154. On a side, the upper flange 154 is attached to the one or more supports 150. On an opposite side, the upper flange 154 is attached to a first end of a first wall portion 156 and a first end of a second wall portion 158. The upper flange 154 is also attached to one or more vertically extending ribs 160 at an upper end thereof. A rib 162, 164 of the one or more vertically extending ribs 160 may also be attached to each of the first wall portion 156 and the second wall portion 158. The one or more vertically extending ribs 160 may also be attached to a lower flange 166. A second end of the first wall portion 156 and a second end of a second wall portion 158 may also be attached to the lower flange 166.

Figure 10:
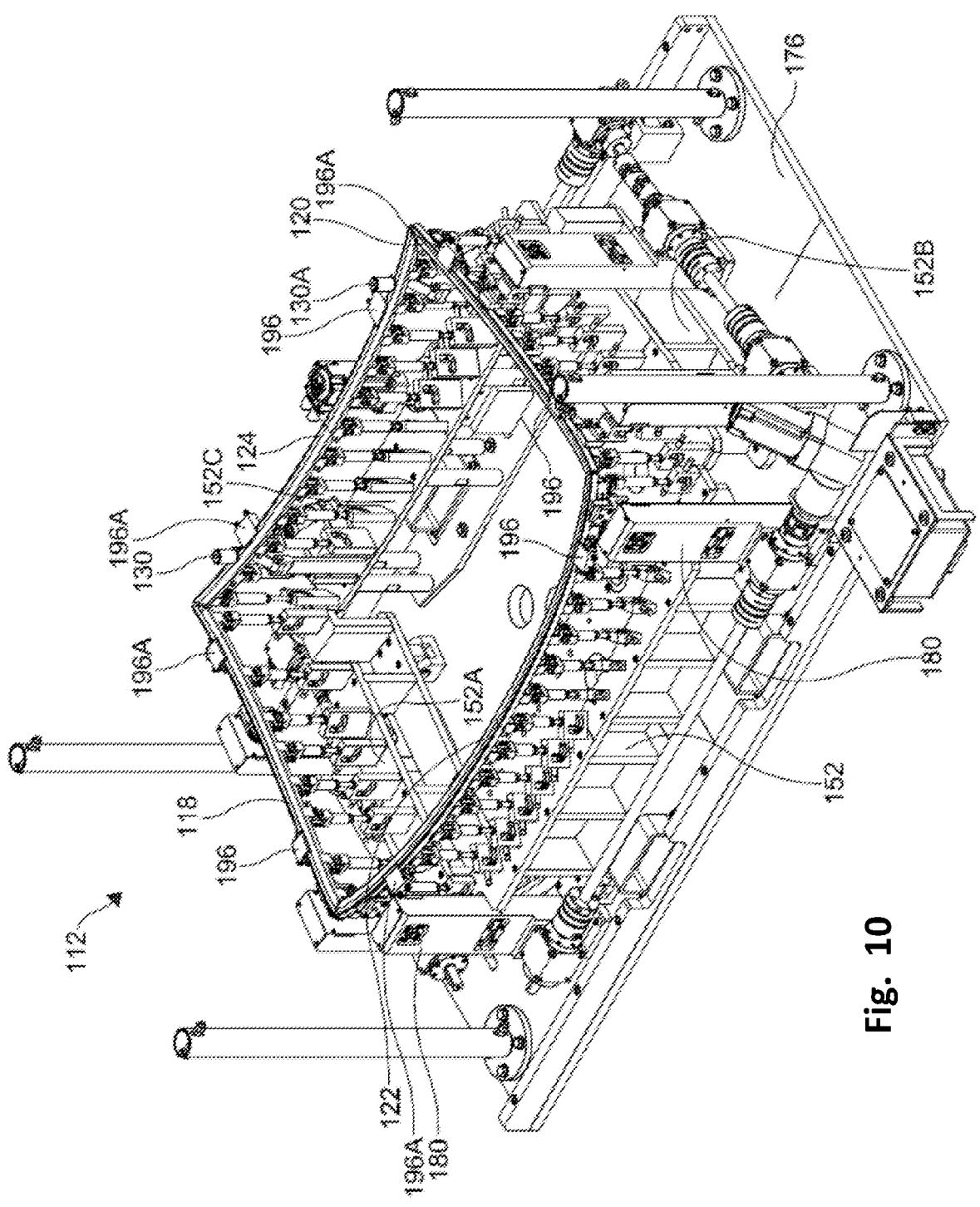
FIG. 10 is a perspective view of an embodiment of a bending tool suitable for use in the coated glass shaping line of FIG. 6.
Figure 11:
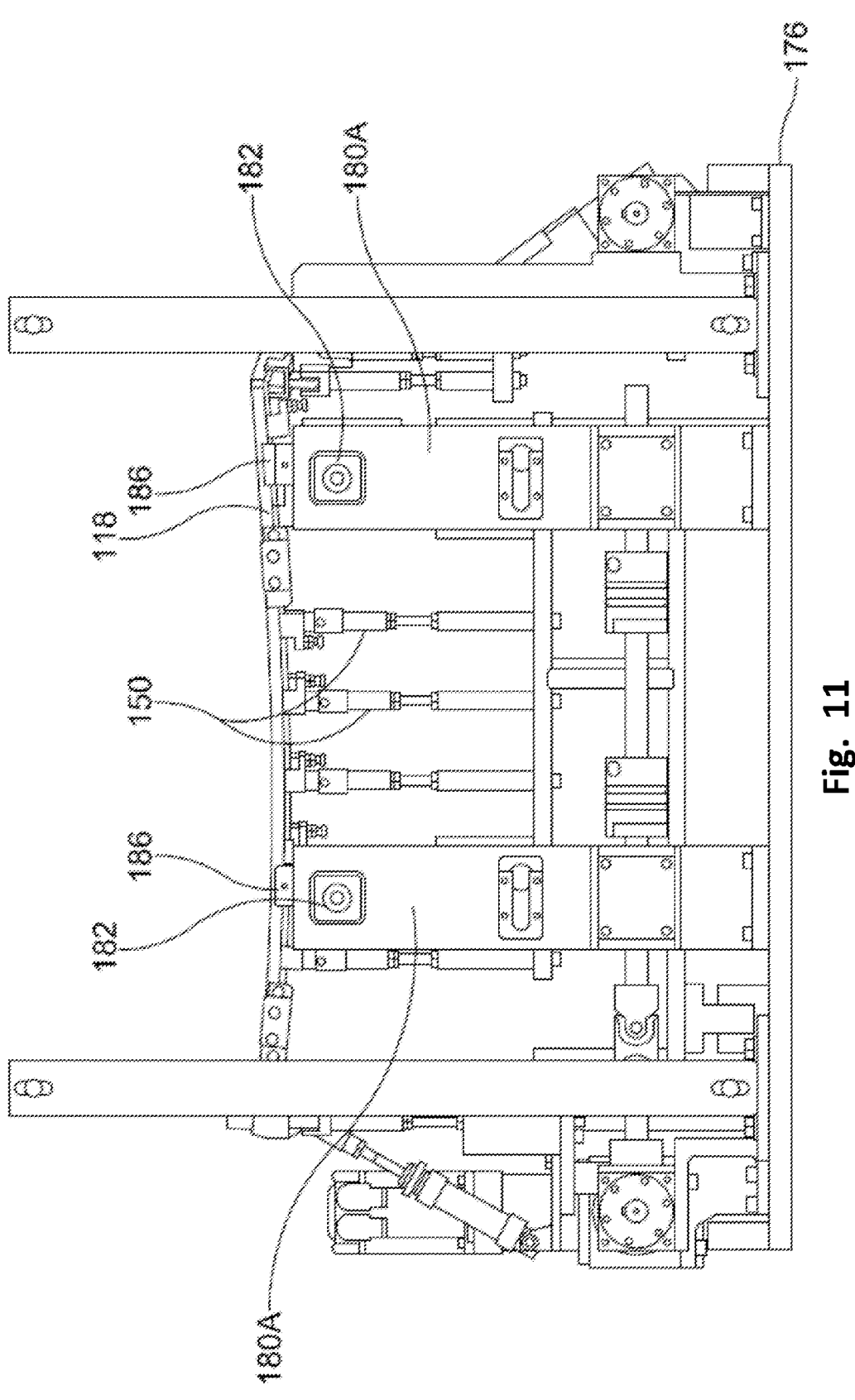
FIG. 11 is a side view of the bending tool of FIG. 10.
Figure 12:
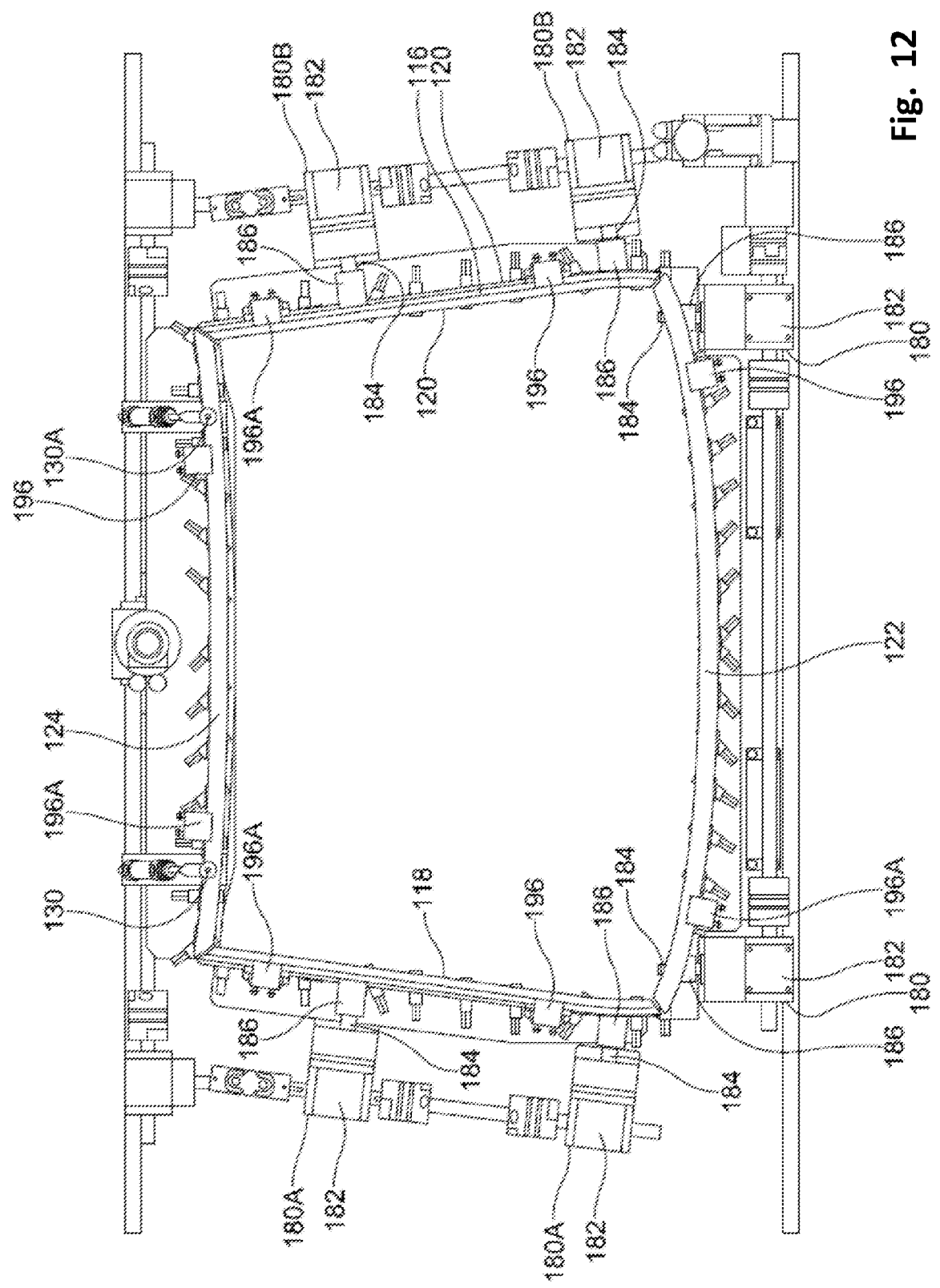
FIG. 12 is a plan view of the bending tool of FIG. 10.
Figure 13:
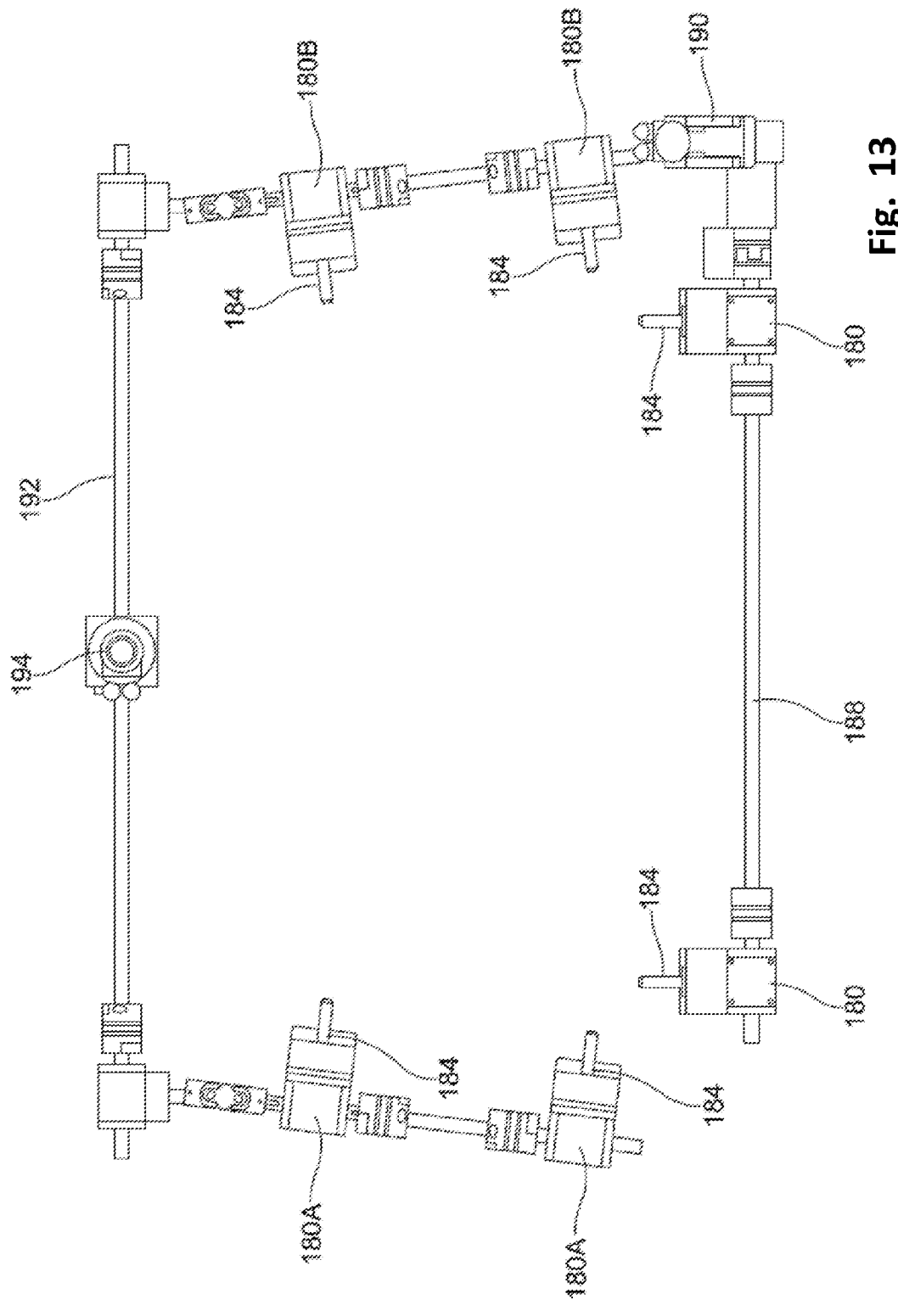
FIG. 13 is a plan view of a portion of the bending tool of FIG. 10 with other portions of the bending tool of FIG. 10 removed for clarity.

In order to enable movement of a segment, the base member 152 is attached to a pair of hinges 168, 170 via the lower flange 166. The hinges 168, 170 illustrated in FIG. 7 are depicted in an exploded manner with certain portions removed for clarity. It is preferred that each hinge 168, 170 illustrated in FIG. 9 comprises a first member 172, which is attached to the lower flange 166. An opening is provided in the first member 172 for receiving a pin (not depicted). The pin is also disposed through a pair of openings in a second member 174. The first member 172 and the second member 174 are joined by disposing the pin through the openings in each member 172, 174. A bushing (not depicted) may be provided in each of the openings in the second member 172. Preferably, each bushing is disposed around a portion of the pin. In an embodiment, the bushings enable rotation of the pin. In another embodiment, rotation of the pin may be enabled by another type of bearing. The position of the second member 172 is fixed by attaching an end of the second member 172 to a frame 176, which is illustrated in FIG. 10 and FIG. 11.

The frame 176 is a stationary member. Thus, in embodiments where the first bending tool 112 comprises the frame 176, the segments 118-124 which are movable may move relative to the frame 176. For example, in an embodiment, the first segment 118 is movable relative to the frame 176. In this embodiment, the first segment 118 may be in a first position relative to the frame 176 and move from the first position to a second position relative to the frame 176. From the second position relative to the frame 176, the first segment 118 can move back to the first position relative to the frame 176 when desired. When the first bending tool 112 comprises other segments 120-124 that are moveable, the other segments 120-124 that are moveable may be in a first position relative to the frame 176 or a second position relative to the frame 176 and those segments 12-124 may move from the first position relative to the frame 176 to the second position relative or vice versa as described above for the first segment 118. Also, the coated glass sheet 106 is movable relative to the frame 176. For example, after the coated glass sheet 106 is deposited on the first bending tool 112 and prior to the coated glass sheet 106 being shaped, the coated glass sheet 106 may be in a first position relative to the frame 176 and move from the first position relative to the frame 176 to a second position relative to the frame 176. Preferably, the frame 176 is constructed of a rigid material. In an embodiment, the frame 176 is a platform.

The base member 152 is movable about an axis of rotation 178. The axis of rotation 178 extends through each pin. The base member 152 is movable in a clockwise and a counter clockwise direction about the axis of rotation 178. Movement of the base member 152 about the axis of rotation 178 enables the third segment 122 to move as described above. For example, in an embodiment, movement of the base member 152 in a clockwise direction moves the third segment 122 from its first position to its second position. In this embodiment, movement of the base member 152 in a counter clockwise direction moves the third segment 122 from its second position to its first position. Preferably, as is illustrated, the third segment 122 is provided above the axis of rotation 178. In these embodiments, the axis of rotation 178 is provided in a generally parallel relationship with the third segment 122.

When one or more of the other segments 118, 120, 124 move as described above, it is preferred that each of the respective base members connected to a segment 118, 120, 124 that moves and each of the segments 118, 120, 124 connected thereto move in a manner similar to the one described above for the third segment 122 and the base member 152. When a base member 152A, 152B moves the first segment 118 and/or second segment 120 from its first position to its second position and vice versa, it is preferred that each base member 152A, 152B has an axis of rotation which is provided in a perpendicular relationship with the axis of rotation 178 described above. However, in embodiments where a segment is not movable such as, for example, when the fourth segment 124 has a fixed position, it is preferred that the first bending tool 112 comprises a base member 152C that is configured such that it does not move about an axis of rotation. In these embodiments, the base member 152C, which is illustrated in FIG. 3, may be attached to the frame 176 in a manner that prevents it from moving about an axis of rotation. Preferably, in these embodiments, the base member 152C configured to not move about an axis of rotation is of a conventional configuration known in the art.

Movement of the base member 152 about the axis of rotation 178 can be achieved utilizing one or more drive assemblies 180. For example, a pair of drive assemblies 180 may be provided to move the base member 152 about the axis of rotation 178. Referring now to FIGS. 10 to 13, each drive assembly 180 may comprise a drive 182. Each drive 182 may comprise a belt, chain, or another drive member which actuates a driven member 184, which are illustrated best in FIG. 13. Each driven member may be a screw, rod, or another member having a threaded end. Each driven member 184 is actuated in a direction which is toward or away from the desired direction of movement. In an embodiment, on an end, each driven member 184 is attached to a connector 186 that receives the driven member 184. The connector 186 and the driven member 184 may be attached to each other via a threaded connection. In an embodiment, each connector 186 is similarly configured. In the embodiments illustrated, each connector 186 is a clevis or a similar member. One or more of the connectors 186 may be attached to a portion of the base member 152. Alternatively, one or more of the connectors 186 may be attached to a segment 118-124, at least one support of the one or more supports 150, or another portion of the first bending tool 112.

Preferably, when a pair of drive assemblies 180 are provided to move the base member 152 about the axis of rotation 178, the drive assemblies 180 are connected to each other via a first transfer shaft assembly 188. The first transfer shaft assembly 188 may comprise a single shaft or two or more shafts. The first transfer shaft assembly 188 receives torque from a first motor 190 connected to the first transfer shaft assembly 188. The torque received by the first transfer shaft assembly 188 is communicated to the pair of drive assemblies 180 connected to the first transfer shaft assembly 188. The torque received by the pair of drive assemblies 180 is utilized to power each drive 182.

Similarly, when one or more additional base members are provided to move one or more of the other segments 118, 120, 124 in a manner similar to the one described above, it is preferred that the one or more additional base members move about an axis of rotation as described above. In some of these embodiments, the movement of the one or more additional base members can be achieved utilizing one or more additional drive assemblies 180A, 180B. It is preferred that the one or more additional drive assemblies 180A, 180B are configured in the same manner as the one or more drive assemblies 180 described above. In an embodiment, the one or more additional drive assemblies 180A, 180B comprise a first pair of drive assemblies 180A and the second pair of drive assemblies 180B. In this embodiment, the first pair of drive assemblies 180A and the second pair of drive assemblies 180B are connected to each other via a second transfer shaft assembly 192. The second transfer shaft assembly 192 may comprise a single shaft or two or more shafts. Connecting the first pair of drive assemblies 180A and the second pair of drive assemblies 180B to each other via the second transfer shaft assembly 192 enables, for example, the base member 152A connected to the first segment 118 and the base member 152B connected to the second segment 120 to move about respective axes of rotation in a simultaneous manner. Enabling the base members 152A, 152B to move in a simultaneous manner, allows the first segment 118 and the second segment 120 to move at the same time as described above.

The second transfer shaft assembly 192 receives torque from a second motor 194 connected to the second transfer shaft assembly 192. The torque received by the second transfer shaft assembly 192 is communicated to the first pair of drive assemblies 180A and the second pair of drive assemblies 180B connected to the second transfer shaft assembly 192. The torque received by the first pair of drive assemblies 180A and the second pair of drive assemblies 180B is utilized to power each respective drive 182 as described above.

The first motor 190 and the second motor 194 may be regulated by one or more controllers (not depicted). The one or more controllers regulate the first motor 190 and the second motor 194 by providing signals which direct power to the first motor 190 and the second motor 194. In an embodiment, power may be directed to the first motor 190 prior to directing power to the second motor 194. In other embodiments, power may be directed to the first motor 190 after directing power to the second motor 194.

When it is desired to move the first segment 118 from its first position to its second position and the second segment 120 from its first position to its second position, power may be directed to the second motor 194. When it is desired to move the third segment 122 from its first position to its second position, power may be directed to the first motor 190. Thus, when it is desired to move the first segment 118 from its first position to its second position and the second segment 120 from its first position to its second position at the same time and prior to moving the third segment 122 from its first position to its second position, power is directed to the first motor 190 after directing power to the second motor 194.

The one or more controllers may be in communication with and provide signals to other portions of the first bending tool 112. Additionally, the one or more controllers may be in communication with and provide signals to the plurality of rollers 138 and the fluid pad assembly 140. The signals provided by the one or more controllers to the first bending tool 112 and a drive mechanism (not depicted) may direct movement of the first bending tool 112, plurality or rollers 138, and/or fluid pad assembly 140 vertically in a downward direction or in an upward direction. It should also be appreciated that, in certain embodiments, the one or more controllers are in communication with and provide a signal to the second bending tool 114 to direct movement of the second bending tool 114 vertically in a downward direction or in an upward direction. The one or more controllers may also be in communication with and provide signals to the centering device 102 to regulate positioning of the glass sheet 106 prior to the glass sheet 106 being deposited on the first bending tool 112.

In certain embodiments, the one or more controllers may operate and/or provide the signals described above under the control of a set of programming instructions, which may also be referred to as software. The one or more controllers may include a memory (not depicted) in which programming instructions are stored. In an embodiment, the set of programming instructions enables the one or more controllers to regulate a flow of fluid, positioning of the glass sheet 106 relative to the shaping surface 116, and/or movement of the bending tools 112, 114, plurality of rollers 138, and fluid pad assembly 140 in a predetermined sequence.

The one or more controllers may also receive signals. For example, the one or more controllers may be in communication with an optical sensor (not depicted) which indicates the location of the glass sheet 106 in the glass shaping line 100. In other embodiments, the one or more controllers may receive a signal from the centering device 102, second bending tool 114, one or more valves, and/or a drive mechanism connected to the plurality of rollers 138 and fluid pad assembly 140.

After the coated glass sheet 106 has been deposited on the first bending tool 112 and prior to being shaped, the position of the coated glass sheet 106 may be adjusted relative to the shaping surface 116 of the first bending tool 112. To adjust the position of the coated glass sheet 106 relative to the shaping surface 116 of the first bending tool 112, at least one of the segments 118-124 moves as described above from its first position to its second position to cause contact between one or more portions of the coated glass sheet 106 and one or more positioning assemblies 196, 196A, 196B. In an embodiment, the first segment 118 moves from its first position to its second position to cause contact between the first portion of the coated glass sheet 106 and the one or more positioning assemblies 196, 196A, 196B. In this embodiment, the first portion of the coated glass sheet 106 may be the first pillar edge portion of the coated glass sheet 106. However, in other embodiments, the first portion of the coated glass sheet 106 is the second pillar edge portion of the coated glass sheet 106. In still other embodiments, the first portion of the coated glass sheet 106 may be the leading edge portion or the trailing edge portion of the coated glass sheet 106. Preferably, a second portion of the coated glass sheet 106 is contacted by one or more positioning assemblies 196, 196A, 196B to adjust the position of the coated glass sheet 106 relative to the shaping surface 116 of the first bending tool 112. In an embodiment, the second segment 120 moves from its first position to its second position to cause contact between the second portion of the coated glass sheet 106 and the one or more positioning assemblies 196, 196A, 196B. In this embodiment, the second portion of the coated glass sheet 106 may be the second pillar edge portion of the coated glass sheet. However, in other embodiments, the second portion of the coated glass sheet may be the first pillar edge portion of the coated glass sheet 106. In still other embodiments, the second portion of the coated glass sheet 106 may be the leading edge portion or the trailing edge portion of the coated glass sheet 106. In still other embodiments, a third portion of the coated glass sheet 106 is contacted by one or more positioning assemblies 196, 196A, 196B to adjust the position of the coated glass sheet 106 relative to the shaping surface 116 of the first bending tool 112. In some embodiments, the third segment 122 moves from its first position to its second position to cause contact between the third portion of the coated glass sheet 106 and the one or more positioning assemblies 196, 196A, 196B. In one such embodiment, the third portion of the coated glass sheet 106 is the trailing edge portion of the coated glass sheet 106. However, in another embodiment, the third portion of the coated glass sheet 106 is the leading edge portion of the coated glass sheet 106. In other embodiments, the third portion of the coated glass sheet 106 may be the first pillar edge portion or the second pillar edge portion of the coated glass sheet 106. It may also be preferred that a fourth portion of the coated glass sheet 106 is contacted by one or more positioning assemblies 196, 196A, 196B to adjust the position of the coated glass sheet 106 relative to the shaping surface 116 of the first bending tool 112. In some embodiments, the fourth segment 124 moves from its first position to its second position to cause contact between the fourth portion of the coated glass sheet 106 and the one or more positioning assemblies 196, 196A, 196B. In one such embodiment, the fourth portion of the coated glass sheet 106 is the leading edge portion of the coated glass sheet 106. However, another embodiment, the fourth portion of the coated glass sheet 106 is the trailing edge portion of the coated glass sheet 106. In other embodiments, the fourth portion of the glass sheet 106 may be the first pillar edge portion or the second pillar edge portion of the coated glass sheet 106.

Contacting one or more portions of the glass sheet 106 with the one or more positioning assemblies 196, 196A, 196B adjusts the position of the coated glass sheet 106, if necessary, to a desired position on the shaping surface 116 of the first bending tool 112. The coated glass sheet 106 is not in the desired position on the shaping surface 116 because of the rotation of the coated glass sheet upon being conveyed through the heating furnace, see FIGS. 4a and 4b.

In order to cause contact between one or more portions of the coated glass sheet 106 and the one or more positioning assemblies 196, 196A, 196B, it is preferred that the one or more positioning assemblies 196, 196A, 196B are disposed adjacent a periphery of the shaping surface 116 of the first bending tool 112. Each of the one or more positioning assemblies 196, 196A, 196B are configured to contact a portion of the coated glass sheet 106 to adjust the position of the coated glass sheet 106 relative to the shaping surface 116 of the first bending tool 112. Preferably, the one or more positioning assemblies 196, 196A, 196B are each similarly configured. However, the method can be practiced utilizing and the first bending tool 112 can be configured when one or more of the one or more positioning assemblies 196, 196A, 196B are not similarly configured.

It is preferred that each positioning assembly 196, 196A, 196B is in mechanical communication with a segment 118-124 and that each segment 118-124 has one or more positioning assemblies 196, 196A, 196B in mechanical communication therewith. For example, as illustrated, the first segment 118, second segment 120, third segment 122, and fourth segment 124 may each have one or more positioning assemblies 196, 196A in mechanical communication therewith. The one or more positioning assemblies 196, 196A, 196B in mechanical communication with a segment that moves, such as, for example, the first segment 118, move with the segment and, prior to contacting a portion of the glass sheet 106, in a direction which is toward the coated glass sheet 106. The positioning assemblies 196, 196A, 196B in mechanical communication with a segment that does not move, do not move in a direction which is toward the coated glass sheet 106 prior to contacting a portion of the coated glass sheet 106. For example, in an embodiment like the one illustrated best in FIG. 12, two positioning assemblies 196, 196A are in mechanical communication with the fourth segment 124. In this embodiment, the fourth segment 124 has a fixed position in that it does not move in a direction which is toward the third segment 122. Also, in this embodiment, the fourth segment 124 does not move in a direction which is toward the coated glass sheet 106 after the coated glass sheet 106 has been deposited on the shaping surface 116 of the first bending tool 112. Thus, in this embodiment, the two positioning assemblies 196, 196A in mechanical communication with the fourth segment 124 do not move in a direction which is toward the coated glass sheet 106 prior to contacting the fourth portion of the coated glass sheet 106.

The features of the one or more positioning assemblies 196, 196A, 196B will now be described below. The one or more positioning assemblies 196, 196A, 196B may be described below with reference to the first segment 118. It should be appreciated that the embodiments of the one or more positioning assemblies 196, 196A, 196B described below could be utilized with any of the segments 118-124 described above.

As illustrated in FIGS. 7 and 10, the one or more positioning assemblies 196, 196A, 196B in mechanical communication with the first segment 118 comprise a first positioning assembly 196. The first positioning assembly 196 is configured to contact a first portion of the coated glass sheet 106 to adjust the position of the coated glass sheet 106 relative to the shaping surface 116 of the first bending tool 112. In some embodiments, the first positioning assembly 196 is in mechanical communication with the first segment 118 such that the first positioning assembly 196 is attached to the first segment 118. The one or more positioning assemblies 196, 196A, 196B in mechanical communication with the first segment 118 may also comprise a second positioning assembly 196A. Similar to the first positioning assembly 196, the second positioning assembly 196A is configured to contact the first portion of the coated glass sheet 106 to adjust the position of the coated glass sheet 106 relative to the shaping surface 116 of the first bending tool 112. In some embodiments, the second positioning assembly 196A is in mechanical communication with the first segment 118 such that the second positioning assembly 196A is attached to the first segment 118. It is preferred that the first positioning assembly 196 and the second positioning assembly 196A are similarly configured.

In certain embodiments, the first positioning assembly 196 moves with the first segment 118. In some of these embodiments, prior to contacting the coated glass sheet 106, the first positioning assembly 196 moves with the first segment 118 in a direction toward the coated glass sheet 106. In one such embodiment, the first positioning assembly 196 moves with the first segment 118 in a direction toward the coated glass sheet 106 to contact the first portion of the coated glass sheet 106. In embodiments where the second positioning assembly 196A is provided, the first positioning assembly 196 and the second positioning assembly 196A are spaced apart from each other. Also, movement of the second positioning assembly 196A is as described above for the first positioning assembly 196 and the second positioning assembly 196A contacts the first portion of the coated glass sheet 106 in a manner similar to the one described above for the first positioning assembly 196. After the coated glass sheet 106 is shaped, the first positioning assembly 196 and, when provided, the second positioning assembly 196A move with the first segment 118 in an opposite direction.

As described above, the first segment 118 moves from a first position to a second position. In an embodiment and after the first segment 118 moves from the first position, the first positioning assembly 196 contacts the first portion of the coated glass sheet 106. Preferably, the first portion is an edge portion of the coated glass sheet 106. The first positioning assembly 196 and, when provided, the second positioning assembly 196A may contact the first portion of the coated glass sheet 106 before the first segment 118 is in its second position. When the first segment 118 is in the second position and the first portion of the coated glass sheet 106 is the first pillar edge portion, the first pillar edge portion of the coated glass sheet 106 abuts an end surface 198 of the first positioning assembly 196 as is illustrated in FIG. 7. It should be appreciated that depending on the size and alignment of the coated glass sheet 106, prior to movement of the first segment 118, a space (not depicted) may be provided between the end surface 198 of the first positioning assembly 196 and the coated glass sheet 106 after the coated glass sheet 106 is deposited on the first bending tool 112. The end surface 198 of the first positioning assembly 196 is configured to contact the first pillar edge portion of the coated glass sheet 106 to adjust the position of the coated glass sheet 106 relative to the shaping surface 116 of the first bending tool 112. Contact between the first positioning assembly 196 and the first pillar edge portion of the coated glass sheet 106 may move the coated glass sheet 106 from a first position to a second position.

As described above, the end surface 198 of the first positioning assembly 196 may contact the first pillar edge portion of the coated glass sheet 106 when the position of the coated glass sheet 106 is being adjusted relative to the shaping surface 116 of the first bending tool 112. Referring now to FIGS. 8 and 14 to 20, the end surface 198 of the first positioning assembly 196 is provided at an end of a body portion 200. The body portion 200 is of a rigid, durable design and may be formed from steel. In an embodiment, the body portion 200 may be L-shaped in cross-section. As illustrated in FIG. 16, a portion of the body portion 200 and the end surface 198 are located over the first segment 118. The body portion 200 extends toward an inner edge 202 of the first segment 118.

A contact material (not depicted) may be attached to the body portion 200. When provided, it is preferred that the contact material covers the end surface 198 of the first positioning assembly 196. The contact material can be attached to the body portion 200 by one or more fasteners, welding, an adhesive, or by another method. Preferably, the contact material is coupled to a side of the body portion 200. When contact material is provided, it is preferred that the contact material separates the portion of the coated glass sheet 106 being contacted to adjust the position of the coated glass sheet 106 relative to the shaping surface 116 of first bending tool 112. In an embodiment, the contact material is formed from stainless steel wire woven cloth. However, the contact material may be formed from other cloth-like materials that are softer than the coated glass sheet 106 and suitable for high temperature applications.

Figure 17:
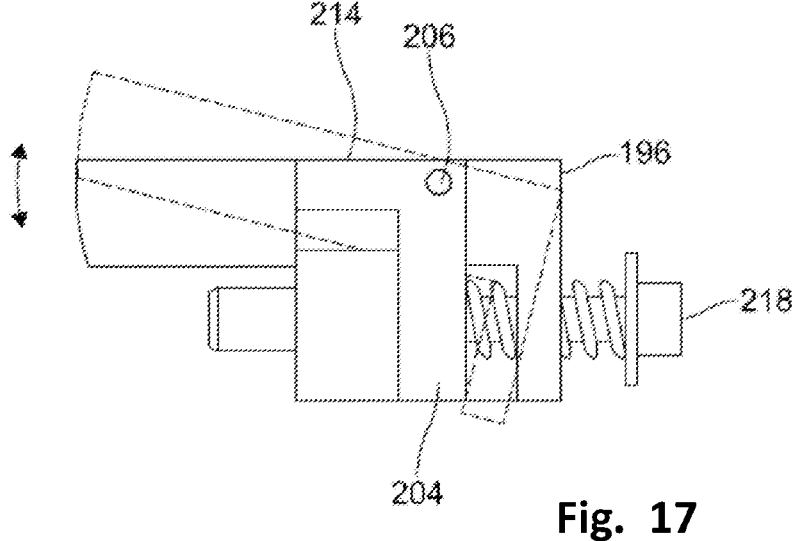
FIG. 17 is a side view of the positioning assembly of FIG. 14 illustrating movement of the positioning assembly of FIG. 14 from a second position to a first position.

A support member 204 receives a portion of the body portion 200. The body portion 200 is attached to the support member 204 via one or more pins 206, which are illustrated in FIG. 16, or another member. Each of the one or more pins 206 are disposed an opening 207, an example of which is illustrated in FIG. 8, in the body portion 200 and a corresponding opening 208 in the support member 204, an example of which is illustrated in FIG. 14. Referring now to FIG. 16, the one or more pins 206 allow the body portion 200 to move vertically in an upward direction or a downward direction and remain attached the support member 204. The movement of the body portion 200 vertically in the upward direction and the downward direction is depicted in FIG. 17. The support member 204 may be attached to the first segment 118 via one or more fasteners 210 and its position relative to the first segment 118 may be fixed.

As noted above, the body portion 200 is configured to move vertically in an upward direction or a downward direction. It is preferred that the body portion 200 moves vertically in the downward direction from a first position to a second position and in the upward direction from the second position to the first position. Prior to shaping the coated glass sheet 106 or when the first positioning assembly 196 is in a rest state, the body portion 200 is in the first position. When the coated glass sheet 106 is being shaped, the body portion 200 is in the second position When the body portion 200 is in the first position, an upper surface 212 of the body portion 200 is oriented in an oblique manner with respect to the shaping surface 116 of the first bending tool 112, which is depicted in FIG. 8. The upper surface 212 of the body portion 200 may also be oriented in an oblique manner with respect to a top surface 214 of the support member 204 and/or a centerline 216, which is illustrated in FIG. 14, of one of the one or more pins 206. However, as depicted in FIG. 17, the orientation of the upper surface 212 of the body portion 200 changes when the body portion 200 is in the second position. For example, when the coated glass sheet 106 is being shaped, the upper surface 212 of the body portion 200 may be provided in a parallel relationship or a substantially parallel relationship with the top surface 214 of the support member 204.

The first positioning assembly 196 also comprises one or more adjustment assemblies 218. As illustrated in FIGS. 14 to 16, in an embodiment, the first positioning assembly 196 may comprise a pair of adjustment assemblies 218. In this embodiment, the adjustment assemblies 218 are spaced apart from each other and positioned on opposite sides of the first positioning assembly 196. The one or more adjustment assemblies 218 allow the first positioning assembly 196 to return to a rest state and the body portion 200 to return to its first position after the glass sheet 106 has been shaped.

Each adjustment assembly 218 comprises an adjustment mechanism. In the embodiments illustrated in FIGS. 14 to 17, the adjustment mechanism comprises one or more of legs. In the embodiments illustrated in FIGS. 14 to 17, the one or more legs comprise a first leg 220 and a second leg 220A. Each leg 220, 220A of the one or more legs may be a screw member. It should be appreciated that alternative types of members could be utilized as the first leg 220 and second leg 220A. For example, in an embodiment, each leg 220, 220A may be a bolt member or a similar member having a threaded end for connecting each leg 220, 220A to the body portion 200 and/or the support member 204. Preferably, the first leg 220 is laterally spaced apart from the second leg 220A and vice versa. Also, it is preferred that each leg 220, 220A is disposed through an opening 222 in the body portion 200 and an opening 224 in the support member 204. A biasing member 226 is provided around each leg 220, 220A. Each biasing member 226 applies a force to the body portion 200 to maintain the body portion 200 in its first position or return the body portion 200 from the second position to the first position. Each biasing member 226 extends into one of the openings 222 in the body portion 200 to engage a portion of the body portion 200 adjacent the opening into which the biasing member 226 extends. In these embodiments, a washer 228 may be provided between an end of each biasing member 226 and an outer end of each leg 220, 220A. In these embodiments, each biasing member 226 may be a spring. When each biasing member 226 is a spring, the force applied by the biasing members 226 to the body portion 200 to maintain the body portion in the first position is a spring force.

Figure 18:
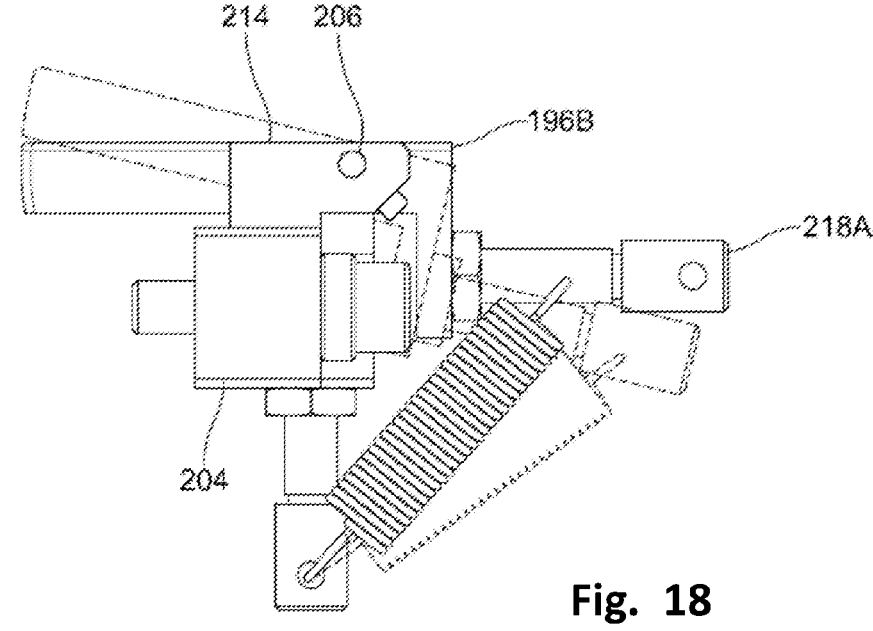
FIG. 18 is a plan view of the positioning assembly of FIG. 19 illustrating movement of the positioning assembly of FIG. 19 from a second position to a first position.
Figure 20:
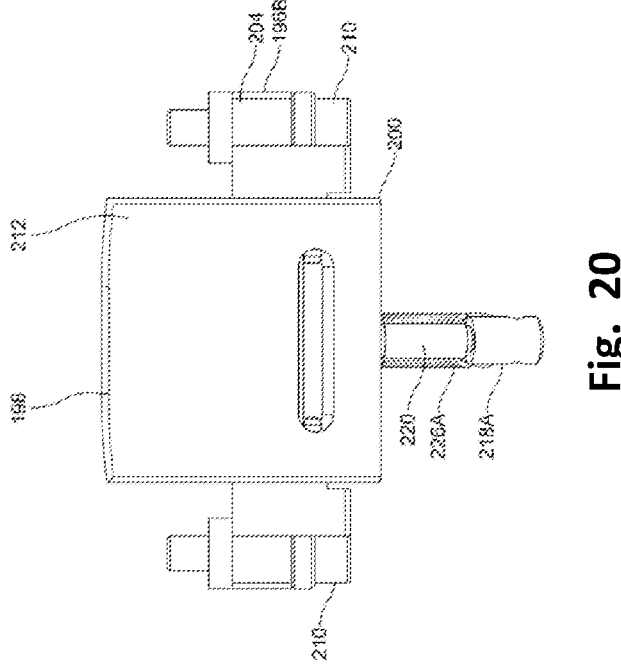
FIG. 20 is a plan view of the positioning assembly of FIG. 19.
Figure 19:
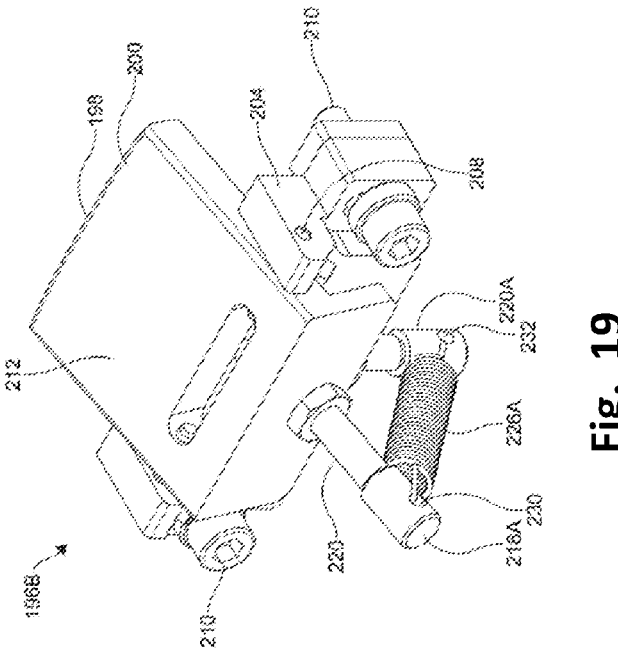
FIG. 19 is a perspective view of another embodiment of a positioning assembly.

FIGS. 18 to 20 illustrate another embodiment of the one or more positioning assemblies 196B. In the embodiment illustrated in FIGS. 18 to 20, the adjustment mechanism 218A comprises a first leg 220 and a second leg 220A.

However, in the embodiment illustrated in FIGS. 18 to 20, the first leg 220 is spaced apart from the second leg 220A in such a manner that the legs 220, 220A are in a perpendicular relationship with each other. Also, in this embodiment, the first leg 220 is attached to the body portion 200 and the second leg 220A is attached to the support member 204. A biasing member 226A is connected to the first leg 220 and the second leg 220A. The biasing member 226A operates in a manner similar to the one described above. However, in the embodiment illustrated in FIGS. 14 to 20, the biasing member 226A applies a force to the body portion 200 via the first leg 220 to maintain the body portion 200 in the first position or return the body portion 200 to the first position. The biasing member 226A is connected to the first leg 220 and the second leg 220A through an opening 230 in the first leg 220 and an opening 232 in the second leg 220A. In these embodiments, the biasing member 226A may be a spring. When the biasing member 226A is a spring, the force applied by the biasing member 226A to the body portion 200 to maintain the body portion 200 in the first position is a spring force.

Referring now to FIG. 8, the body portion 200 extends toward the inner edge 202 of the first segment 118. Prior to shaping the coated glass sheet 106, the body portion 200 is in the first position. In the first position, a portion of the end surface 198 and a portion of the upper surface 212 of the body portion 200 is at a height which is greater than the first major surface 146 of the coated glass sheet 106 after the coated glass sheet 106 has been deposited on the first bending tool 112. Immediately prior to the coated glass sheet 106 being shaped, the second bending tool 114 contacts and applies a force to the first positioning assembly 196. More particularly, the second bending tool 114 contacts and applies a force to the upper surface 212 of the body portion 200. The force applied to the upper surface 212 of the body portion 200 by the second bending tool 114 is greater than the force applied to the body portion 200 by the biasing member(s) 226, 226A. Thus, the force applied to the upper surface 212 of the body portion 200 by the second bending tool 114 moves the body portion 200 vertically in a downward direction from the first position to the second position. As the body portion 200 is moved vertically in the downward direction from the first position to a second position, a portion the body portion 200 is received by a groove 234 provided in an outer edge of the first segment 118. The body portion 200 is received by the groove 234 when the body portion 200 is in the second position.

During shaping of the glass sheet 106, the body portion 200 is in the second position. In the second position, the upper surface 212 of the body portion 200 is aligned or substantially aligned with the first major surface 146 of the coated glass sheet 106. Also, at this time, the end surface 198 may be provided in a parallel or substantially parallel relationship with the first pillar edge portion of the coated glass sheet 106. After shaping the coated glass sheet 106, the second bending tool 114 is removed from contact with first positioning assembly 196, which removes the force provided by the second bending tool 114 to the upper surface 212 of the body portion 200. After the second bending tool 114 is removed from contact with the first positioning assembly 196, the force applied by the biasing member(s) 226, 226A returns the body portion 200 to its first position by moving the body portion 200 from the second position to the first position.

In an embodiment, when it is desired to adjust the position of the coated glass sheet 106 relative to the shaping surface 116 of the first bending tool 112, the first segment 118 is moved from a first position to a second position. Moving the first segment 118 from its first position to its second position causes the first portion of the coated glass sheet 106 to be contacted one or more positioning assemblies 196, 196A, 196B in mechanical communication with the first segment 118. Contacting the first portion of the coated glass sheet 106 with the more positioning assemblies 196, 196A, 196B in mechanical communication with the first segment 118 adjusts the position of the coated glass sheet 106 relative to the shaping surface 116 of the first bending tool 112. In the second position, the one or more positioning assemblies 196, 196A, 196B in mechanical communication with the first segment 118 contact the first portion of the coated glass sheet 106. In this embodiment, the first portion of the coated glass sheet 106 may be the first pillar edge portion of the coated glass sheet 106. Preferably, a second portion of the coated glass sheet 106 is contacted to adjust the position of the coated glass sheet 106 relative to the shaping surface 116 of the first bending tool 112. Preferably, the second portion of the coated glass sheet 106 is an edge portion of the coated glass sheet 106. To contact the second portion of the coated glass sheet 106, a second segment 120 may be moved from a first position to a second position. Moving the second segment 120 from its first position to its second position causes the second portion of the coated glass sheet 106 to be contacted by one or more positioning assemblies 196, 196A, 196B in mechanical communication with the second segment 120. Contacting the second portion of the coated glass sheet 106 with the more positioning assemblies 196, 196A, 196B in mechanical communication with the second segment 120 adjusts the position of the coated glass sheet relative to the shaping surface 116 of the first bending tool 112. In the second position, the one or more positioning assemblies 196, 196A, 196B in mechanical communication with the second segment 120 contact the second portion of the coated glass sheet 106. In this embodiment, the second portion of the coated glass sheet 106 may be the second pillar edge portion of the coated glass sheet 106. In some embodiments, a third portion of the coated glass sheet 106 is contacted to adjust the position of the coated glass sheet 106 relative to the shaping surface 116 of the first bending tool 112. Preferably, the third portion of the coated glass sheet 106 is an edge portion of the coated glass sheet 106. To contact the third portion of the coated glass sheet 106, it is preferred that a third segment 122 is moved from a first position to a second position. Moving the third segment 122 from its first position to its second position causes the third portion of the coated glass sheet 106 to be contacted one or more positioning assemblies 196, 196A, 196B in mechanical communication with the third segment 122. Contacting the third portion of the glass sheet 106 with the more positioning assemblies 196, 196A, 196B in mechanical communication with the third segment 122 adjusts the position of the coated glass sheet 106 relative to the shaping surface 116 of the first bending tool 112. In the second position, the one or more positioning assemblies 196, 196A, 196B in mechanical communication with the third segment 122 contact the third portion of the coated glass sheet 106. In this embodiment, the third portion of the coated glass sheet 106 may be the trailing edge portion of the coated glass sheet 106. In further embodiments, a fourth portion of the coated glass sheet 106 may be contacted to adjust the position of the coated glass sheet 106 relative to the shaping surface 116 of the first bending tool 112. Preferably, the fourth portion of the coated glass sheet 106 is an edge portion of the coated glass sheet 106. To contact the fourth portion of the coated glass sheet 106, it is preferred that the fourth segment 124 does not move toward the coated glass sheet 106. Instead, in this embodiment, the coated glass sheet 106 moves toward the one or more positioning assemblies 196, 196A, 196B in mechanical communication with the fourth segment 124 to cause contact between the fourth portion of the coated glass sheet 106 and the one or more positioning assemblies 196, 196A, 196B in mechanical communication with the fourth segment 124. Contact between the fourth portion of the coated glass sheet 106 and the one or more positioning assemblies 196, 196A, 196B in mechanical communication with the fourth segment 124 positions the coated glass sheet 106 relative to the shaping surface 116 of the first bending tool 112. In this embodiment, the fourth portion of the coated glass sheet 106 may be the leading edge portion of the coated glass sheet 106. After the coated glass sheet 106 has been contacted as described above and is in a desired position relative to the shaping surface 116 of the first bending tool 112 in accordance with one of the embodiments described above, the coated glass sheet 106 is shaped.

Contacting one or more portions of the glass sheet 106 as described above adjusts the position of the coated glass sheet 106 relative to the shaping surface 116 of the first bending tool 112. Advantageously, such positioning of the coated glass sheet 106 relative to the shaping surface 116 of the first bending tool 112 results in improved alignment between the coated glass sheet 106 and the shaping surface 116 prior to shaping and corrects for the shift in position that may be imparted to the coated glass sheet upon heating in the heating furnace 104. The improved alignment imparts the coated glass sheet 106 with the desired properties and ensures the coated glass sheet 106 is of a high quality after shaping. Furthermore, when the coated glass shaping line 100 and first bending tool 112 include the fluid pad assembly 140, optical distortion caused by marks on the coated glass sheet 106 may be reduced when compared with other shaping methods and glass shaping lines.

Referring back to FIG. 6, in embodiments where the coated glass sheet 106 is shaped via press bending, movement between the first bending tool 112 and the second bending tool occurs to shape the coated glass sheet 106. In embodiments where the coated glass sheet 106 is to be press bent, once the coated glass sheet 106 has been positioned relative to the shaping surface 116 of the first bending tool 112 as described above, it is preferred that the first bending tool 112 moves toward the second bending tool 114, with the second bending tool 114 not moving, to press bend the coated glass sheet 106. In this embodiment, following movement of the first bending tool 112, the coated glass sheet 106 is press bent between the first bending tool 112 and the second bending tool 114. However, in other embodiments, the first bending tool 112 may move toward the second bending tool 114 and the second bending tool 114 may move toward the first bending tool 112. Alternatively, the second bending tool 114 may move toward the first bending tool 112, with the first bending tool 112 not moving. In any of these alternatives the objective is to effect relative movement between the first bending tool 112 and the second bending tool 114 to press bend the coated glass sheet 106 between the first bending tool 112 and the second bending tool 114.

During pressing, a vacuum may be drawn on passages 236 formed in the second bending tool 114 to facilitate forming the coated glass sheet 106 into a desired shape. Upon completion of shaping the coated glass sheet 106, the coated glass sheet 106 may be released from the second bending tool 114 by way of positive pressure being applied through the passages 236 of the second bending tool 114.

Upon completion of the bending process, a conveying device (not shown) serves to transport the shaped coated glass sheet 106 into a lehr 238. In the lehr 238, the shaped coated glass sheet 106 may be tempered or annealed as known in the art and cooled to a temperature at which handling can occur. The shaped coated glass sheet 106 may be used in the construction of a window for a vehicle, such as a windscreen, side window, sunroof or a rear window. Such a window may be monolithic or laminated.

Although not illustrated, the bending station 110 may include a camera system arranged to view the coated glass sheet on the first bending tool 112. The position of the coated glass sheet relative to the shaping surface 116 may be recorded, before and/or after having been repositioned thereon. The camera system may be in communication with a control system to control the movement of any of the movable segments 118, 120, 122, 124. The positional information obtained from the camera system may be used to modify the control system for subsequent positioning of coated glass sheets.

The present invention provides an improved method for shaping coated glass sheets that allows movement of a coated glass sheet during a heating step in a heating furnace to be corrected such that after the coated glass sheet has been heated, the coated glass sheet can be moved into a desired position for bending.

The present invention has the following aspects:

Aspect 1. A method for shaping a coated glass sheet comprising the steps:

(i) providing a coated glass sheet having a first coating on a least a portion of a first major surface thereof, the coated glass sheet having an opposing second major surface;

(ii) positioning the coated glass sheet at an entrance to a heating furnace; (iii) conveying the coated glass sheet through the heating furnace to heat the coated glass sheet to a temperature suitable for shaping;

(iv) depositing the coated glass sheet on a first bending tool for supporting the coated glass sheet thereon, the coated glass sheet being in a first position relative to the first bending tool;

(v) contacting a first portion of the coated glass sheet such that the coated glass sheet is moved to a second position relative to the first bending tool; and (vi) shaping the coated glass sheet on the first bending tool.

Aspect 2. A method according to aspect 1, wherein after the coated glass sheet has been deposited on the first bending tool during step (iv), the coated glass sheet is disposed over a first segment of the first bending tool, the first segment at least partially defining a shaping surface of the first bending tool; and wherein in step (v) moving the first segment of the first bending tool from a first position to a second position causes contact with the first portion of the coated glass sheet, the contact with the first portion of the glass sheet adjusting a position of the glass sheet relative to the shaping surface of the first bending tool.

Aspect 3. A method according to aspect 2, wherein movement of the first segment of the first bending tool from the first position to the second position is in a direction which is toward a second segment of the first bending tool.

Aspect 4. A method according to aspect 2 or aspect 3, further comprising moving the first segment from the second position to the first position prior to the coated glass sheet being disposed over the first segment of the first bending tool.

Aspect 5. A method according to any of the aspects 2 to 4, further comprising moving a second segment of the first bending tool from a first position to a second position to cause contact with a second portion of the coated glass sheet, the contact with the second portion of the coated glass sheet adjusting the position of the coated glass sheet relative to the shaping surface of the first bending tool, wherein movement of the second segment of the first bending tool from the first position to the second position is in a direction which is toward the first segment of the first bending tool.

Aspect 6. A method according to any of the aspects 2 to 5, wherein the first portion of the coated glass sheet is contacted by a first positioning assembly, the first positioning assembly moving with the first segment and in a direction which is toward the coated glass sheet prior to contacting the first portion of the coated glass sheet.

Aspect 7. A method according to aspect 5, further comprising moving the second segment of the first bending tool from a first position to a second position to cause contact with a second portion of the coated glass sheet, the contact with the second portion of the coated glass sheet adjusting the position of the coated glass sheet relative to the shaping surface of the first bending tool, wherein movement of the first segment of the first bending tool and movement of the second segment of the first bending tool is in a direction which is perpendicular to a direction of coated glass travel.

Aspect 8. A method according to aspect 7, further comprising moving a third segment of the first bending tool from a first position to a second position to cause contact with a third portion of the coated glass sheet, the contact with the third portion of the coated glass sheet adjusting the position of the coated glass sheet relative to the shaping surface of the first bending tool, wherein movement of the third segment of the first bending tool is in a direction which is perpendicular to a direction of movement of the first segment and is toward a fourth segment of the first bending tool.

Aspect 9. A method according to aspect 8, further comprising disposing the coated glass sheet over a fourth segment of the first bending tool.

Aspect 10 A method according to aspect 9, wherein disposing the glass sheet over the fourth segment of the first bending tool causes contact with a fourth portion of the coated glass sheet to adjust the position of the coated glass sheet relative to the shaping surface of the first bending tool.

Aspect 11. A method according to aspect 9 or aspect 10, wherein the first segment, second segment, third segment, and fourth segment are configured as a ring which supports the coated glass sheet in a peripheral region thereof.

Aspect 12. A method according to any of the aspects 9 to 11, wherein the coated glass sheet is also disposed over the second segment of the first bending tool and the third segment of the first bending tool and the first segment of the first bending tool, second segment of the first bending tool, third segment of the first bending tool, and fourth segment of the first bending tool each define a discrete portion of the shaping surface.

Aspect 13. A method according to any of the aspects 9 to 12, wherein the fourth segment of the first bending tool does not move toward the third segment of the first bending tool, preferably wherein the fourth segment of the first bending tool is fixed and is not movable relative to the first, second or third segments of the first bending tool.

Aspect 14. A method according to any of the aspects 9 to 13, wherein the fourth portion of the coated glass sheet is a leading edge portion of the coated glass sheet and the leading edge portion of the coated glass sheet is contacted by a stopper to regulate the position of the coated glass sheet relative to the shaping surface of the first bending tool and after contact with the leading edge portion of the coated glass sheet the stopper moves away from the leading edge portion of the coated glass sheet, preferably wherein the stopper moves away from the leading edge portion of the coated glass sheet vertically in a downward direction or in a direction of glass travel.

Aspect 15. A method according to claim any of the aspects 1 to 14, wherein the first bending tool comprises at least one shaping rail having an upper shaping surface for supporting the glass sheet thereon and/or wherein the first bending tool comprises a ring configured to support the glass sheet in a peripheral region thereof.

Aspect 16. A method according to aspect 15, wherein during step (v) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the first portion of the coated glass sheet and move the coated glass sheet from the first position to the second position.

Aspect 17. A method according to any of the aspects 1 to 16, wherein during step (vi), the coated glass sheet is shaped on the first bending tool by press bending the coated glass sheet between the first bending tool and a second bending tool, preferably wherein during step (vi), the glass sheet is shaped on the first bending tool by moving the first bending tool with the coated glass sheet thereon relative to the second bending tool to press bend at least one portion of the coated glass sheet between at least one portion of the first bending tool and at least one portion of the second bending tool.

Aspect 18. A method according to aspect 16, wherein the second bending tool has a convex shaping surface and the first bending tool has a complementary concave shaping surface, preferably wherein the second bending tool is a full-faced mould.

Aspect 19. A method according to aspect 17 or aspect 18, wherein the second bending tool comprises at least two portions (a first portion and a second portion), preferably wherein the first portion of the second bending tool is movable with respect to the second portion of the second bending tool and/or wherein one part of the coated glass sheet is shaped between the first bending tool and the first portion of the second bending tool, and another part of the coated glass sheet is shaped between the first bending tool and the second portion of the second bending tool.

Aspect 20. A method according to any of the aspects 17 to 19, wherein during step (vi) a vacuum is applied through one or more opening in the surface of the second bending tool.

Aspect 21. A method according to aspect claim 1, wherein during step (vi) the coated glass sheet is shaped by sagging under the influence of gravity whilst being supported on the first bending tool, optionally with the provision of an additional pressing force to shape selective areas of the coated glass sheet.

Aspect 22. A method according to any of the aspects 1 to 21, wherein during step (iv), the coated glass sheet is deposited on the first bending tool by moving the first bending tool relative to the glass sheet.

Aspect 23. A method according to any of the aspects 1 to 22, wherein during step (iv), the glass sheet is deposited on the first bending tool by dropping the glass sheet onto the first bending tool.

Aspect 24. A method according to any of the aspects 1 to 23, wherein the first portion of the coated glass sheet is an edge portion of the coated glass sheet.

Aspect 25. A method according to any of the aspects 1 to 24, wherein the coated glass sheet is a single coated glass sheet or one sheet in a stack of glass sheets comprising at least two glass sheets.

Aspect 26. A method according to any of the aspects 1 to 25, wherein the second major surface of the coated glass sheet faces the conveying means.

Aspect 27. A method according to any of the aspects 1 to 26, wherein the conveying means comprises one or more roller and/or one or more air flotation device.

Aspect 28. A method for aligning a hot coated glass sheet having a first coating on at least a portion of a first major surface thereof, the method comprising the steps of providing a coated glass bending operation, the coated glass bending operation including a first bending tool; providing a positioning device comprising a movable portion positioned adjacent the first bending tool, a fixed portion positioned adjacent the movable portion, and an actuator disposed between the fixed portion and the movable portion; disposing the hot coated glass sheet on the first bending tool; engaging the actuator to cause the movable portion to move with respect to the fixed portion; and contacting a first portion of the coated glass sheet with the movable portion to adjust a position of the hot coated glass sheet with respect to the first bending tool from a first position to a second position.

Aspect 29. A method according to any of the aspects 1 to 28, wherein the first coating comprises a low emissivity coating.

Aspect 30. A method according to any of the aspects 1 to 29, wherein the first coating covers the entire first major surface of the coated glass sheet.

Aspect 31. A method according to any of the aspects 1 to 30, wherein the first coating comprises an optically absorbing layer, preferably an optically opaque layer.

Aspect 32. A method according to aspect 31, wherein the first coating is used to provide the glass sheet with an obscuration band, preferably wherein the obscuration band extends as a band around the entire periphery of the first major surface of the coated glass sheet.

Aspect 33. A method according to any of the aspects 1 to 28, wherein the coated glass sheet comprises a second coating on the first coating.

Aspect 34. A method according to aspect 33, wherein the first coating is a low emissivity coating and the second coating is a coating for providing the glass sheet with an obscuration region.

Aspect 35. A method according to aspect 33, wherein the first coating is a coating for providing the glass sheet with an obscuration region and the second coating is a low emissivity coating.

Aspect 36. A method according to aspect 34 or aspect 35, wherein the coating for providing the glass sheet with an obscuration region is optically opaque and/or is black and/or is a printed ink and/or wherein the obscuration region is in the form of a band, preferably extending around the entire periphery of the first major surface of the coated glass sheet.

Aspect 37. A method according to any of the aspects 1 to 36, wherein the first coating comprises at least one layer of silver, preferably at least two layers of silver, more preferably at least three layers of silver, even more preferably at least four layers of silver.

Aspect 38. A method according to any of the aspects 1 to 37, wherein the heating furnace comprises at least one radiative heating means and/or at least one convective heating means.

Aspect 39. A method according to any of the aspects 1 to 38, including a monitoring step for monitoring the position of the coated glass sheet on the first bending tool to provide an output, wherein the output is used to provide an input for moving the or a subsequent coated glass sheet from the first position to the second position.

Aspect 40. A shaping line for shaping a coated glass sheet comprising a furnace for heating the coated glass sheet to a temperature suitable for shaping; conveyor means for conveying the coated glass sheet through the furnace; and a coated glass sheet shaping section comprising a first bending tool for supporting the glass sheet thereon during a coated glass bending operation and at least one (a first) positioning device arranged relative to the first bending tool; characterised in that when a coated glass sheet is supported on the first bending tool the first positioning device is movable from a first configuration to a second configuration to contact a first portion of the coated glass sheet on the first bending to adjust the position of the coated glass sheet on the first bending tool.

The invention claimed is:

1. A method for shaping a coated glass sheet supported on a first bending tool, wherein the first bending tool comprises at least one shaping rail having an upper shaping surface for supporting the glass sheet thereon and/or wherein the first bending tool comprises a ring configured to support the glass sheet in a peripheral region thereof, the coated glass sheet having a target position relative to the first bending tool, the method comprising:

step (i) providing a coated glass sheet having a first coating on at least a portion of a first major surface thereof, the coated glass sheet having an opposing second major surface;

step (ii) positioning the coated glass sheet at an entrance to a heating furnace;

step (iii) conveying the coated glass sheet through the heating furnace to heat the coated glass sheet to a temperature suitable for shaping and to develop a temperature gradient in the coated glass sheet;

step (iv) depositing the coated glass sheet on a first bending tool for supporting the coated glass sheet thereon, the coated glass sheet being in a first position relative to the first bending tool;

step (v) contacting a first portion of the coated glass sheet such that the coated glass sheet is moved to a second position relative to the first bending tool to correct a shift in position of the coated glass sheet after being conveyed through the heating furnace, the second position of the coated glass sheet being closer to the target position than the first position of the coated glass sheet;

step (vi) shaping the coated glass sheet on the first bending tool, and wherein during step (v) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the first portion of the coated glass sheet and move the coated glass sheet from the first position to the second position.

2. A method according to claim 1, wherein after the coated glass sheet has been deposited on the first bending tool, the coated glass sheet is disposed over a first segment of the first bending tool, the first segment at least partially defining a shaping surface of the first bending tool; and wherein in step (v) moving the first segment of the first bending tool from a first position to a second position causes contact with the first portion of the coated glass sheet, the contact with the first portion of the glass sheet adjusting a position of the glass sheet relative to the shaping surface of the first bending tool.

3. A method according to claim 1, wherein during step (vi), the coated glass sheet is shaped on the first bending tool by press bending the coated glass sheet between the first bending tool and a second bending tool; or wherein during step (vi) the coated glass sheet is shaped by sagging under the influence of gravity whilst being supported on the first bending tool, optionally with the provision of an additional pressing force to shape selective areas of the coated glass sheet.

4. A method according to claim 1, wherein the first coating comprises a low emissivity coating having an emissivity between 0.03 and 0.45 measured in accordance with EN12898 and/or wherein the first coating comprises an optically absorbing layer.

5. A method according to claim 1, wherein the coated glass sheet comprises a second coating on the first coating and wherein the first coating is a low emissivity coating having an emissivity between 0.03 and 0.45 measured in accordance with EN12898 and the second coating is a coating for providing the glass sheet with an obscuration region, or wherein the first coating is a coating for providing the glass sheet with an obscuration region and the second coating is a low emissivity coating having an emissivity between 0.03 and 0.45 measured in accordance with EN12898.

6. A method according to claim 1, wherein the first coating comprises at least one layer of silver.

7. A method according to claim 1, wherein the first coating comprises an obscuration band extending around a periphery of the first major surface of the coated glass sheet.

8. A method according to claim 1, wherein the first coating comprises an obscuration band and a fade-out band, the obscuration band extending around a periphery of the first major surface of the coated glass sheet and the fade-out band being located inboard of the obscuration band.

9. A method according to claim 1, wherein the coated glass sheet comprises a second coating on the first coating and wherein the first coating is a low emissivity coating having an emissivity between 0.03 and 0.45 measured in accordance with EN12898 and the second coating is a coating for providing the glass sheet with an obscuration band and a fade-out region.

10. A method according to claim 1, wherein the coated glass sheet comprises a second coating on the first coating and wherein the first coating is a coating for providing the glass sheet with an obscuration band and a fade-out region and the second coating is a low emissivity coating having an emissivity between 0.03 and 0.45 when measured in accordance with EN12898.

11. A method according to claim 1, including monitoring a position of the coated glass sheet on the first bending tool to provide an output, wherein the output is used to provide an input for moving the coated glass sheet from the first position to the second position.

12. A method for shaping a coated glass sheet supported on a first bending tool, wherein the first bending tool comprises at least one shaping rail having an upper shaping surface for supporting the glass sheet thereon and/or wherein the first bending tool comprises a ring configured to support the glass sheet in a peripheral region thereof, the coated glass sheet having a target position relative to the first bending tool, the method comprising:

step (i) providing a coated glass sheet having a first coating on at least a portion of a first major surface thereof, the coated glass sheet having an opposing second major surface;

step (ii) positioning the coated glass sheet at an entrance to a heating furnace;

step (iii) conveying the coated glass sheet through the heating furnace on a conveyor to heat the coated glass sheet to a temperature suitable for shaping and to develop a curvature such that the coated glass sheet rotates on the conveyor whilst being conveyed through the heating furnace;

step (iv) depositing the coated glass sheet on a first bending tool for supporting the coated glass sheet thereon, the coated glass sheet being in a first position relative to the first bending tool;

step (v) contacting a first portion of the coated glass sheet such that the coated glass sheet is moved to a second position relative to the first bending tool to correct a shift in position of the coated glass sheet after being conveyed through the heating furnace, the second position of the coated glass sheet being closer to the target position than the first position of the coated glass sheet;

step (vi) shaping the coated glass sheet on the first bending tool, and wherein during step (v) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the first portion of the coated glass sheet and move the coated glass sheet from the first position to the second position.

13. A method according to claim 12, wherein during step (iii) the coated glass sheet is heated to develop a temperature gradient in the coated glass sheet.

14. A method according to claim 12, wherein the coated glass sheet comprises a second coating on the first coating and wherein the first coating is a low emissivity coating having an emissivity between 0.03 and 0.45 measured in accordance with EN12898 and the second coating is a coating for providing the glass sheet with an obscuration region, or wherein the first coating is a coating for providing the glass sheet with an obscuration region and the second coating is a low emissivity coating having an emissivity between 0.03 and 0.45 measured in accordance with EN12898.

15. A method for shaping a coated glass sheet supported on a first bending tool, wherein the first bending tool comprises at least one shaping rail having an upper shaping surface for supporting the glass sheet thereon and/or wherein the first bending tool comprises a ring configured to support the glass sheet in a peripheral region thereof, the coated glass sheet having a target position relative to the first bending tool, the method comprising:

step (i) providing a coated glass sheet having a first coating on at least a portion of a first major surface thereof, the coated glass sheet having an opposing second major surface;

step (ii) positioning the coated glass sheet at an entrance to a heating furnace;

step (iii) conveying the coated glass sheet through the heating furnace on a roller conveyor with the second major surface facing the roller conveyor to heat the coated glass sheet to a temperature suitable for shaping and to develop a temperature gradient in the coated glass sheet;

step (iv) depositing the coated glass sheet on a first bending tool for supporting the coated glass sheet thereon, the coated glass sheet being in a first position relative to the first bending tool;

step (v) contacting a first portion of the coated glass sheet such that the coated glass sheet is moved to a second position relative to the first bending tool to correct for the rotation of the coated glass sheet after being conveyed through the heating furnace, the second position of the coated glass sheet being closer to the target position than the first position of the coated glass sheet; (vi)

(vi) shaping the coated glass sheet on the first bending tool, and wherein during step (v) a positioning device comprising a movable portion positioned adjacent the first bending tool, a fixed portion positioned adjacent the movable portion, and an actuator disposed between the fixed portion and the movable portion is provided such that upon engaging the actuator the movable portion is caused to move with respect to the fixed portion to contact the first portion of the coated glass sheet and move the coated glass sheet from the first position to the second position.

16. A method according to claim 15, wherein the coated glass sheet comprises a second coating on the first coating and wherein the first coating is a low emissivity coating having an emissivity between 0.03 and 0.45 measured in accordance with EN12898 and the second coating is a coating for providing the glass sheet with an obscuration region, or wherein the first coating is a coating for providing the glass sheet with an obscuration region and the second coating is a low emissivity coating having an emissivity between 0.03 and 0.45 measured in accordance with EN12898.

17. A method according to claim 15, wherein during step (iii) the coated glass sheet becomes curved such that the coated glass sheet rotates on the roller conveyor whilst being conveyed through the heating furnace.

* * * * *